(12) United States Patent
Ahn et al.

(10) Patent No.: US 11,381,284 B2
(45) Date of Patent: Jul. 5, 2022

(54) ACCESS POINT SUPPORTING WIRELESS COMMUNICATION AND OPERATION METHOD THEREOF

(71) Applicant: SAMSUNG ELECTRONICS CO., LTD., Suwon-si (KR)

(72) Inventors: Minki Ahn, Seoul (KR); Wook Bong Lee, San Jose, CA (US); Sungsoo Kim, Seoul (KR); Joonsuk Kim, Seoul (KR); Eun Sung Jeon, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/342,680

(22) Filed: Jun. 9, 2021

(65) Prior Publication Data

US 2021/0399771 A1 Dec. 23, 2021

Related U.S. Application Data

(60) Provisional application No. 63/040,644, filed on Jun. 18, 2020.

(30) Foreign Application Priority Data

Jul. 23, 2020 (KR) .................. 10-2020-0091791

(51) Int. Cl.
*H04B 7/02* (2018.01)
*H04B 7/0426* (2017.01)
*H04B 7/0456* (2017.01)

(52) U.S. Cl.
CPC ........... *H04B 7/043* (2013.01); *H04B 7/0456* (2013.01)

(58) Field of Classification Search
CPC .............................. H04B 7/043; H04B 7/0456
(Continued)

(56) References Cited

U.S. PATENT DOCUMENTS 7,076,263 B2 7/2006 Medvedev et al.
7,502,420 B2 * 3/2009 Ketchum ............. H04B 7/0417
375/267

(Continued)

FOREIGN PATENT DOCUMENTS

KR 10-0962120 6/2010
KR 10-1242177 3/2013
(Continued)

OTHER PUBLICATIONS

IEEE P802.11ax, "Part 11: Wireless LAN Medium Access Control (MAC) and Physical Layer (PHY) Specifications, Amendment 1: Enhancements for High Efficiency WLAN", Feb. 2019, 784 pages.

(Continued)

*Primary Examiner* — Helene E Tayong
(74) *Attorney, Agent, or Firm* — F. Chau & Associates, LLC

(57) ABSTRACT

An operation method of a transmitting device such as an access point providing wireless communication includes receiving a feedback of channel response information from an external communication device, generating a beam steering matrix based on the channel response information, generating a power allocation matrix based on an average SNR for each of a plurality of streams included in the channel response information, and performing beamforming on the external communication device based on the generated power allocation matrix and the generated beam steering matrix. The channel response information is a compressed beamforming feedback of multiple input multiple output single user beamforming. A first power allocated to a first stream, of which an average SNR is a first value, from among the plurality of streams is larger than a second power allocated to a second stream, of which an average SNR is a second value greater than the first value.

20 Claims, 18 Drawing Sheets

(58) Field of Classification Search
USPC .......................................................... 375/267
See application file for complete search history.

(56) References Cited

U.S. PATENT DOCUMENTS

| | | | |
|---|---|---|---|
| 7,920,889 B2 | 4/2011 | Hoshino et al. | |
| 9,007,263 B2* | 4/2015 | Su ........................ | H04B 7/0417 |
| | | | 342/373 |
| 10,979,122 B2 | 4/2021 | Jeon et al. | |
| 2008/0247370 A1* | 10/2008 | Gu ....................... | H04B 7/0691 |
| | | | 370/338 |
| 2009/0203335 A1* | 8/2009 | Lee ...................... | H04B 7/0443 |
| | | | 455/103 |
| 2010/0248635 A1* | 9/2010 | Zhang .................. | H04B 7/0697 |
| | | | 455/63.1 |
| 2014/0254493 A1* | 9/2014 | Lamy-Bergot ...... | H04W 52/262 |
| | | | 370/328 |
| 2021/0028836 A1 | 1/2021 | Jeon et al. | |

FOREIGN PATENT DOCUMENTS

| KR | 10-1792907 | 11/2017 |
|---|---|---|
| KR | 10-2020-0112576 | 10/2020 |

OTHER PUBLICATIONS

Y. Yao et al., "Rate-Maximizing Power Allocation in OFDM Based on Partial Channel Knowledge," IEEE Transactions on Wireless Communications, vol. 4, No. 3, May 2005, pp. 1073-1083.
E. Jeon et al, "Adaptive Feedback of the Channel Information for Beamforming in IEEE 802.11ax WLANs" VT, 6 pages.

* cited by examiner

ACCESS POINT SUPPORTING WIRELESS COMMUNICATION AND OPERATION METHOD THEREOF

CROSS-REFERENCE TO RELATED APPLICATIONS

This application claims priority under 35 U.S.C. § 119 to U.S. Patent Provisional No. 63/040,644 filed Jun. 18, 2020, in the U.S. Patent and Trademark Office and Korean Patent Application No. 10-2020-0091791 filed Jul. 23, 2020, in the Korean Intellectual Property Office, the disclosures of which are incorporated by reference herein in their entireties.

TECHNICAL FIELD

This disclosure relates generally to wireless communication, and more particularly, to MIMO-based communication between an access point supporting wireless communication and an operation method thereof.

DISCUSSION OF THE RELATED ART

Wireless communication provides data communication between various devices over a wireless channel. Improvements are continually sought to support higher data transfer rates for satisfying demands of increasing wireless data traffic.

A common scheme to increase data transfer rate is known as multi-input and multi-output (MIMO), which uses a plurality of transmission antennas at the transmitting device (e.g., an access point in a WLAN system) and a plurality of receiving antennas at a receiving device (e.g., a wireless terminal, user equipment (UE), etc.). A beamforming technique for directing an antenna beam formed by the transmission antennas to a specific receiving device is being used to improve the efficiency of wireless communication.

In an effort to improve communication quality, the receiving device may measure conditions of the wireless channel, referred to as "channel state information (CSI)", and feed back the CSI to the transmitting device. The transmitting device may then use the feedback information to make beamforming adjustments using a technique known as precoding, which may reduce data errors due to multipath fading or the like.

SUMMARY

Embodiments of the inventive concept provide wireless communication with improved reliability and performance.

According to an exemplary embodiment, an operation method of an access point configured to provide wireless communication includes receiving feedback of channel response information from an external communication device, generating a beam steering matrix based on the channel response information, generating a power allocation matrix based on an average signal to noise ratio (SNR), corresponding to each of a plurality of streams, included in the channel response information, and performing beamforming with respect to the external communication device based on the generated power allocation matrix and the generated beam steering matrix. The channel response information is a compressed beamforming feedback of a multiple input multiple output single user beamforming (MIMO SUBF) based communication. A first power allocated to a first stream, of which an average SNR is a first value, from among the plurality of streams is higher than a second power allocated to a second stream, of which an average SNR is a second value greater than the first value, from among the plurality of streams.

According to an exemplary embodiment, an operation method of an access point configured to provide wireless communication includes receiving feedback of channel response information from an external communication device, generating a beam steering matrix based on the channel response information, selecting a level of a modulation coding scheme, selecting one of a first power allocation matrix and a second power allocation matrix based on the selected level of the modulation coding scheme, and performing beamforming on the external communication device based on the selected one of the first and second power allocation matrices and the beam steering matrix. Each of the first and second power allocation matrices is generated based on information of an average signal to noise ratio (SNR) for each of a plurality of streams, where the information is included in the channel response information. The first power allocation matrix has a structure of a diagonal matrix and the second power allocation matrix has a structure of a block rotation matrix. The channel response information is a compressed beamforming feedback of multiple input multiple output single user beamforming (MIMO SUBF). A first power allocated to a first stream, of which an average SNR is a first value, from among the plurality of streams is larger than a second power allocated to a second stream, of which an average SNR is a second value greater than the first value, from among the plurality of streams.

According to an exemplary embodiment, an access point configured to provide wireless communication includes a controller that receives feedback of channel state information including information about an average signal to noise ratio (SNR) for each of a plurality of streams and information about a beam steering matrix from an external communication device and outputs a power allocation matrix and the beam steering matrix based on the channel state information, a signal processor that processes data to be transmitted to the external communication device, a power allocating engine that performs power allocation on a signal processed by the signal processor based on the power allocation matrix from the controller, a beamforming engine that performs beamforming based on an output of the power allocating engine and the beam steering matrix, and a plurality of antennas that transmit an output of the beamforming engine to the external communication device. The power allocating engine identically applies the power allocation matrix to each of a plurality of subcarriers to perform the power allocation, and the transmitting device performs the wireless communication with the external communication device using MIMO based beamforming (MIMO SUBF).

BRIEF DESCRIPTION OF THE FIGURES

The above and other features of the inventive concept will become readily apparent by reference to the following detailed description when considered in conjunction with the accompanying drawings, in which like reference characters refer to like elements or features, wherein.

DETAILED DESCRIPTION OF EMBODIMENTS

Below, embodiments of the inventive concept may be described in detail and clearly to such an extent that one of ordinary skill in the art may easily implement the inventive concept.

In the detailed description or drawings, the terms "unit", "engine", "module", etc. or function blocks performing various operations may be implemented with circuitry running software; firmware; a hardware circuit; or various combinations thereof.

Figure 1:
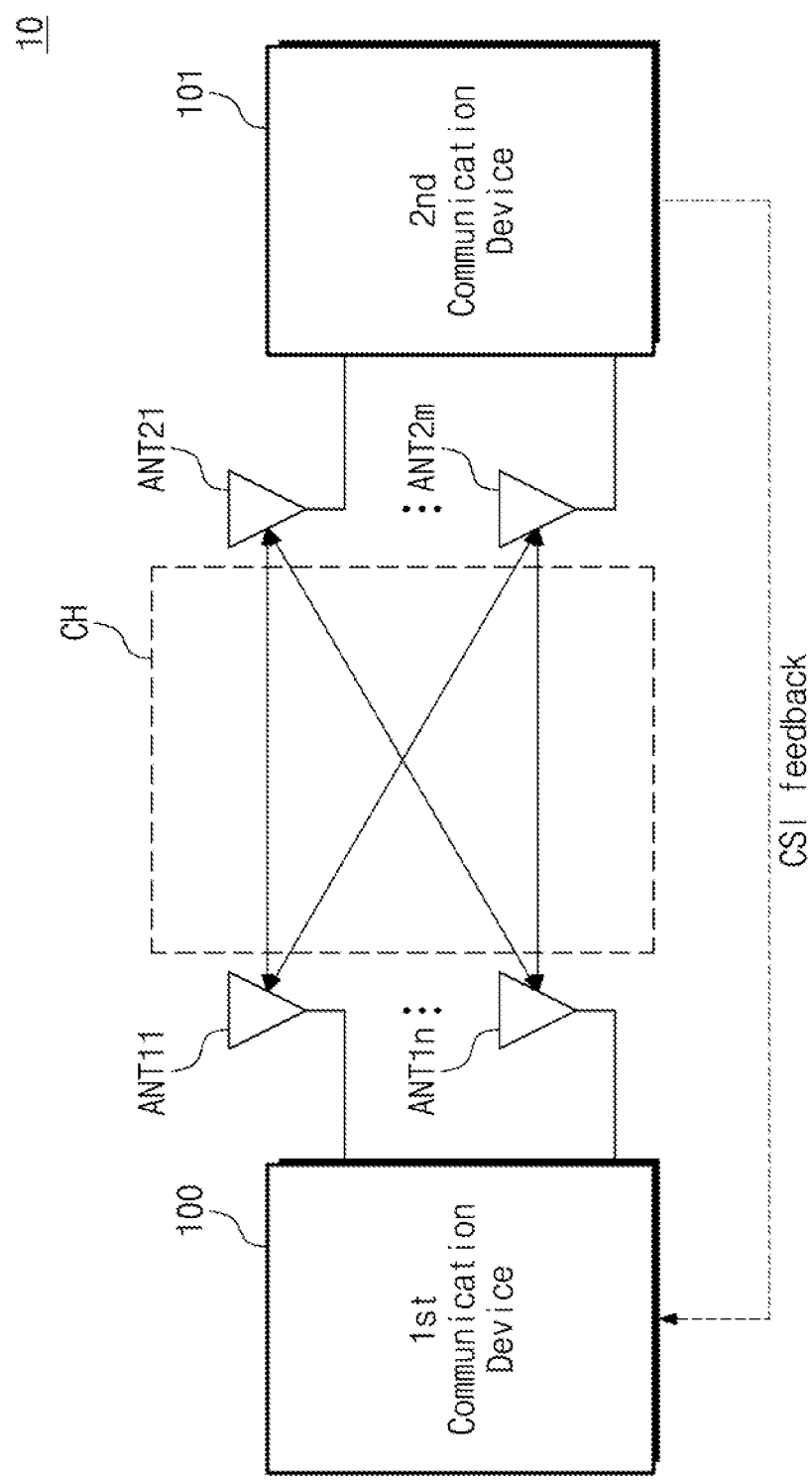
FIG. 1 is a block diagram illustrating a wireless communication system according to an embodiment of the inventive concept.

FIG. 1 is a block diagram illustrating a wireless communication system 10 according to an embodiment of the inventive concept. The wireless communication system 10 may include a first communication device 100 and a second communication device 101, hereafter just "device 100" and "device 101" for brevity. Each of devices 100 and 101 may be one of various electronic devices configured to support wireless communication, such as an access point (AP), a base station, a repeater, a Wi-Fi router, a smartphone, a tablet, and a laptop. (Device 101 may be referred to as an "external communication device" with respect to device 100.) Below, for convenience of description, it is assumed that device 100 is an access point (AP) or a wireless access point (WAP) connected with a wireless network and configured to provide a wireless network to device 101. It is further assumed that device 101 is a station (e.g., a smartphone) configured to perform wireless communication with device 100. Each of devices 100 and 101 may include a wireless communication chipset complying with a wireless local area network (WLAN) standard.

Devices 100 and 101 may perform wireless communication with each other over a wireless channel CH. Devices 100 and 101 may together implement a multi-input and multi-output single-user beamforming (MIMO SUBF) system in which a beam formed by multiple antennas at the transmitting device is intended for a single receiving device (single user) having a plurality of receive antennas. For example, device 100 may include a plurality of first antennas ANT11 to ANT1$n$, and device 101 may include a plurality of second antennas ANT21 to ANT2$m$. Devices 100 and 101 may perform wireless communication by using the plurality of first and second antennas ANT11 to ANT1$n$ and ANT21 to ANT2$m$. In this case, device 100 may perform beamforming for forming an antenna beam, based on channel state information (CSI) (interchangeably, "channel response information") from device 101.

For example, device 100 configured as an access point AP may send a sounding packet (e.g., a null data packet (NDP)) through the first antennas ANT11 to ANT1$n$. The sounding packet from device 100 may be provided to the second antennas ANT21 to ANT2$m$ of device 101 over the wireless channel CH. In this case, a receive signal associated with a k-th subcarrier (included within the sounding packet) from among receive signals of device 101 may be modeled by Equation 1 below.

$$Y_k = \sqrt{\frac{E_s}{N_{tx}}} H_k S_k + N_k \quad \text{[Equation 1]}$$

In Equation 1, $Y_k$ is a receive signal received by device 101; $S_k$ is a sounding signal vector having a dimension of "$N_{tx} \times 1$"; $N_{tx}$ indicates the number of first antennas ANT11 to ANT1$n$ (i.e., the number of transmission antennas) of device 100; and $E_S$ indicates a total power transmitted by the first antennas ANT11 to ANT1$n$. $H_k$ is a channel matrix indicating a frequency response of the channel CH, and a dimension of the channel matrix is "$N_{rx} \times N_{tx}$", where $N_{rx}$ indicates the number of second antennas ANT21 to ANT2$m$ of device 101 (i.e., the number of receive antennas thereof). $N_k$ is reception noise. The subscript "k" indicates that the relevant parameter is associated with the k-th subcarrier of the sounding packet. For instance, $Y_k$ indicates a receive signal for the k-th subcarrier, $S_k$ is the sounding signal vector for the k-th subcarrier, etc.

Device 101 may estimate $H_k$ of the channel CH from a receive signal by using a channel estimator. Device 101 may perform singular value decomposition (SVD) on the estimated $H_k$, where a result of the SVD may be expressed by Equation 2 below.

$$H_k = U_k \Sigma_k V_k^H \quad \text{[Equation 2]}$$

In Equation 2, each of $U_k$ and $V_k^H$ is a unitary matrix, and $\Sigma_k$ is a diagonal matrix including singular values (arranged diagonally within the matrix) of the channel CH. $V_k^H$ is a conjugate transpose matrix of $V_k$, and $V_k$ is a beam steering matrix used to perform beamforming.

Device 101 may feed the channel state information ("CSI") back to device 100. For example, devices 100 and 101 may perform wireless communication in compliance with a given wireless communication protocol, and device 101 may feed the CSI back to device 100 in compliance with the given wireless communication protocol. The given wireless communication protocol may be based on at least one of various wireless communication schemes such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented by a radio technology such as universal terrestrial radio access (UTRA) or CDMA2000.

TDMA may be implemented by a radio technology such as global system for mobile communications (GSM)/general packet radio service (GPRS)/enhanced data rates for GSM evolution (EDGE). The OFDMA may be implemented by a radio technology such as IEEE 802.11 (Wi-Fi) (e.g., IEEE 802.11ac, IEEE 802.11ax, or IEEE 802.11n), IEEE 802.16 (WiMAX), IEEE 802-20, or EUTRA (evolved UTRA). UTRA may be a part of a universal mobile telecommunications system (UMTS). $3^{rd}$ generation partnership project (3GPP) long term evolution (LTE) that is a part of an evolved UMTS (E-UMTS) using E-UTRA adopts the OFDMA for a downlink and adopts SC-FDMA for an uplink. LTE-A (advanced) is an evolution of 3GPP LTE.

The channel state information complying with the given wireless communication protocol may include information about the beam steering matrix (referred to later as "I-$V_k$"). Device 101 may calculate $V_k^H$ through the SVD described with reference to Equation 2 above and may calculate a beam steering matrix $V_k$ based on the calculated $V_k^H$. Device 101 may convert complex numbers, which are elements of the beam steering matrix $V_k$, to an angle and may provide device 100 with information about the angle as at least part of the CSI. The information I-$V_k$ about the beam steering matrix may be referred to herein as "compressed beamforming feedback information".

The CSI complying with the given wireless communication protocol may include information about a signal to noise ratio (SNR) for each stream received at device 100. Herein, the term "stream" may be used to refer to a signal representing a data sequence received by one receiving antenna among the receiving antennas ANT21 to ANT2$m$. Depending on the context, a "stream" may be a signal of a particular subcarrier among a plurality of subcarriers, transmitted by one or more transmitting antennas and received by one or more receiving antennas. In other cases, a stream may be a "spatial stream" defined by signal energy arriving from a particular direction, and may be a composite signal derived from signals received by at least two of the receiving antennas ANT21 to ANT2$m$. (Analog or digital beamforming performed at the receiving device 101 may be used to differentiate among signals arriving from different directions.) In the case of a modulation scheme such as SC-FDMA involving the concurrent transmission of subcarriers, where each subcarrier may represent different data, a stream may be a data sequence represented by a particular subcarrier. Device 101 may calculate information about an average signal to noise ratio (SNR) for each stream based on Equation 3 below and may provide device 100 with a result of the calculation as the channel state information.

$$AvgSNR_{db,i} = E\left\{10\log_{10}\left(\frac{E_s}{N_{tx}\sigma_n^2}\gamma_i\right)\right\} i = 1, 2, \ldots, N_{ss} \quad \text{[Equation 3]}$$

Referring to Equation 3 above, $AvgSNR_{db,i}$ indicates an average signal to noise ratio of an i-th stream, averaged over a predetermined period of time. E{ } indicates an expectation operator. $N_{ss}$ indicates the number of streams to be transmitted through the beamforming of the first communication device 100. $\sigma_n^2$ indicates a noise variance. Below, an average signal to noise ratio of an i-th stream may be expressed in a linear unit (rather than decibels as in equation 3) and referred to as an "average SNR". That is, the average SNR of the i-th stream may be denoted by "$SNR_i$", and $SNR_i$ may be expressed by Equation 4 below. Average SNR may mean an individual average signal to noise ratio for a particular stream among a plurality of streams received at device 101.

$$SNR_i = 10^{\frac{AvgSNR_{db,i}}{10}} \quad \text{[Equation 4]}$$

Device 100 may perform beamforming based on the channel state information provided from device 101. To this end, device 100 may individually allocate an amount of power (interchangeably, "a power level", "a power" or "an amplitude") to each of a plurality of streams based on the average SNR. In this case, total efficiency of wireless communication may be improved, and/or total packet error performance may be improved.

For example, some wireless communication protocols (e.g., IEEE 802.11ac and IEEE 802.11ax) permit or require the same modulation and coding scheme for each stream. Under this condition, in the case where average SNR differences among a plurality of streams are high, the possibility that an error occurs at a stream having a relatively low average SNR may increase. This causes a degradation in the total packet error performance. To prevent such degradation, a power may be differently allocated for each of a plurality of streams. For example, device 100 may perform beamforming by using the beam steering matrix $V_k$ included in the CSI. The beam steering matrix $V_k$ may be a matrix calculated through the singular value decomposition. Because the probability that an error occurs at a stream of a relatively low average SNR is high, device 100 may apply a power allocation matrix $P_k$ which can be derived from Equation 5 below through knowledge of the other variables therein.

$$Y_k = \sqrt{\frac{E_s}{N_{tx}}} H_k V_k P_k S_k + N_k \quad \text{[Equation 5]}$$

In Equation 5, $P_k$ indicates the power allocation matrix for the k-th subcarrier, and the remaining variables were defined earlier. A power allocation scheme based on Equation 5 above is a scheme of applying water-filling power allocation or inverse water-filling power allocation by using singular values within the matrix $\Sigma_k$ corresponding to the channel CH under the assumption that device 100 knows a channel response characteristic (i.e., a channel matrix $H_k$) for each of a plurality of subcarriers.

In an exemplary embodiment, in a specific wireless communication system or protocol, the CSI fed back to device 100 from device 101 may only include information ("I-$V_k$") about the beam steering matrix $V_k$ and the average SNR for each stream. In this case, because singular values (e.g., within the matrix $\Sigma_k$) for each of a plurality of subcarriers is not fed back to the first communication device 100 (in other words, the first communication device 100 fails to recognize, or is not configured to recognize, a frequency response characteristic for each of the plurality of subcarriers, e.g., the channel matrix $H_k$), a power allocation method for each subcarrier based on Equation 5 above may not be applied to the specific wireless communication system or protocol.

Device 100 according to an embodiment of the inventive concept may provide power allocation for each stream, based on an average SNR for each stream. For instance, in a specific wireless communication system (e.g., MIMO SUBF), even though an access point fails to recognize a channel response or singular values for each subcarrier, a total data packet error may decrease by performing power allocation based on the average SNR for each stream. Example power allocation methods of device 100 will be more fully described below.

Figure 2:
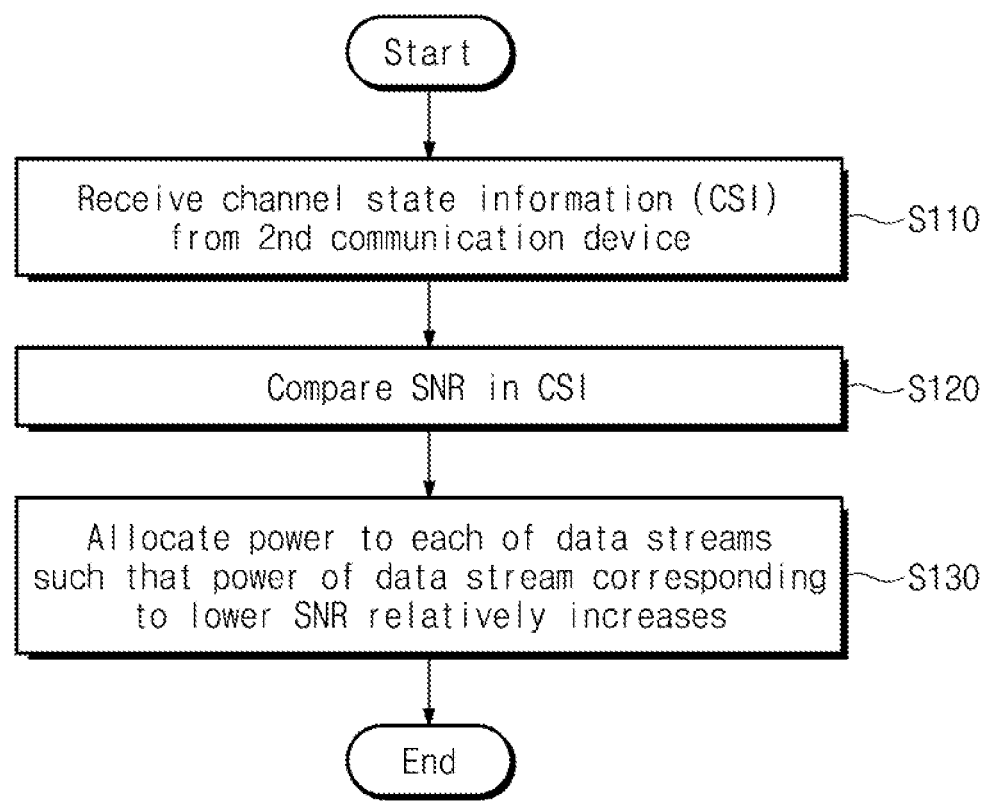
FIG. 2 is a flowchart illustrating an operation of a first communication device of FIG. 1.

FIG. 2 is a flowchart illustrating an operation of a first communication device 100 of FIG. 1. Referring to FIGS. 1 and 2, in operation S110, device 100 may receive the channel state information (CSI) from device 101. For example, 100 may be an access point AP, and 101 may be a user terminal performing wireless communication with device 100. In this case, device 100 may output a sounding packet. Device 101 may receive the sounding packet and calculate information about a beam steering matrix and information about an average SNR for each stream based on the received sounding packet, and may feed the calculated information back to device 100 as the channel state information CSI. In this regard device 101 may feed back the CSI over the channel CH or over a separate feedback channel.

In operation S120, device 100 may compare average SNRs of respective streams included in the CSI. In operation S130, device 100 may perform power allocation on each stream such that a power allocated to a stream having a relatively low average SNR relatively increases.

As described above, device 100 may improve the total data packet error performance by relatively increasing a power allocated to a stream having a relatively low average SNR.

Figure 3:
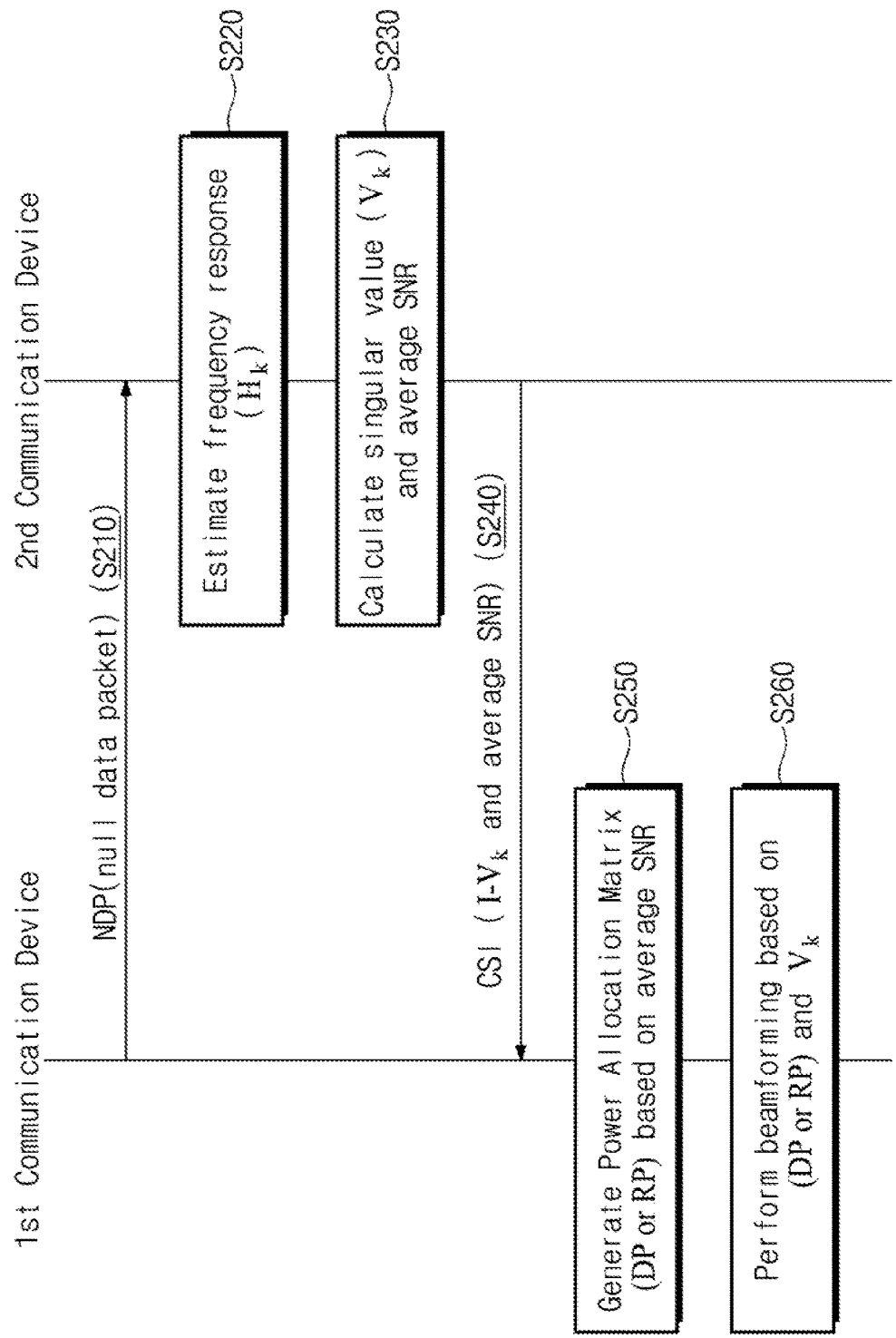
FIG. 3 is a flowchart illustrating an operation of a wireless communication system of FIG. 1.

FIG. 3 is a flowchart illustrating an operation of a wireless communication system of FIG. 1. Referring to FIGS. 1 and 3, in operation S210, device 100 may transmit a sounding packet (e.g., a null data packet (NDP)).

In operation S220, device 101 may receive the sounding packet NDP and estimate a frequency response $H_k$ of the channel CH based on the received sounding packet NDP.

In operation S230, the second communication device 101 may perform singular value decomposition on the estimated frequency response $H_k$ to calculate the beam steering matrix $V_k$ and the average SNR. The process of calculating the beam steering matrix $V_k$ and the average SNR may be as described above.

In operation S240, the device 101 may feed the channel state information CSI including information "I-Vk" about the beam steering matrix $V_k$ and the average SNR back to device 100.

In operation S250, device 100 may generate a power allocation matrix based on the average SNR included in the CSI. In an exemplary embodiment, the power allocation matrix may be the same value or the same matrix with respect to each of a plurality of subcarriers used in wireless communication between devices 100 and 101.

In an exemplary embodiment, the power allocation matrix may be in the form of a diagonal structure and a diagonal matrix, in which case the power allocation matrix is designated as "DP", but other implementations are possible. For example, the power allocation matrix may be in the form of a rotation structure or a rotation matrix, designated as "RP". The power allocation matrix DP of the diagonal structure (below, referred to as a "diagonal power matrix") will be described with reference to FIGS. 4 to 7, and the power allocation matrix RP of the rotation structure (below, referred to as a "rotation power matrix") will be described with reference to FIGS. 8 to 13.

In operation S260, the first communication device 100 may perform beamforming based on the power allocation matrix DP or RP and the beam steering matrix $V_k$ (generated based on the information I-$V_k$). When the beamforming is performed based on the diagonal power matrix DP and the beam steering matrix $V_k$, a power allocated to a stream having a relatively low average SNR may relatively increase, and thus, the total data packet error performance may be improved.

Figure 4:
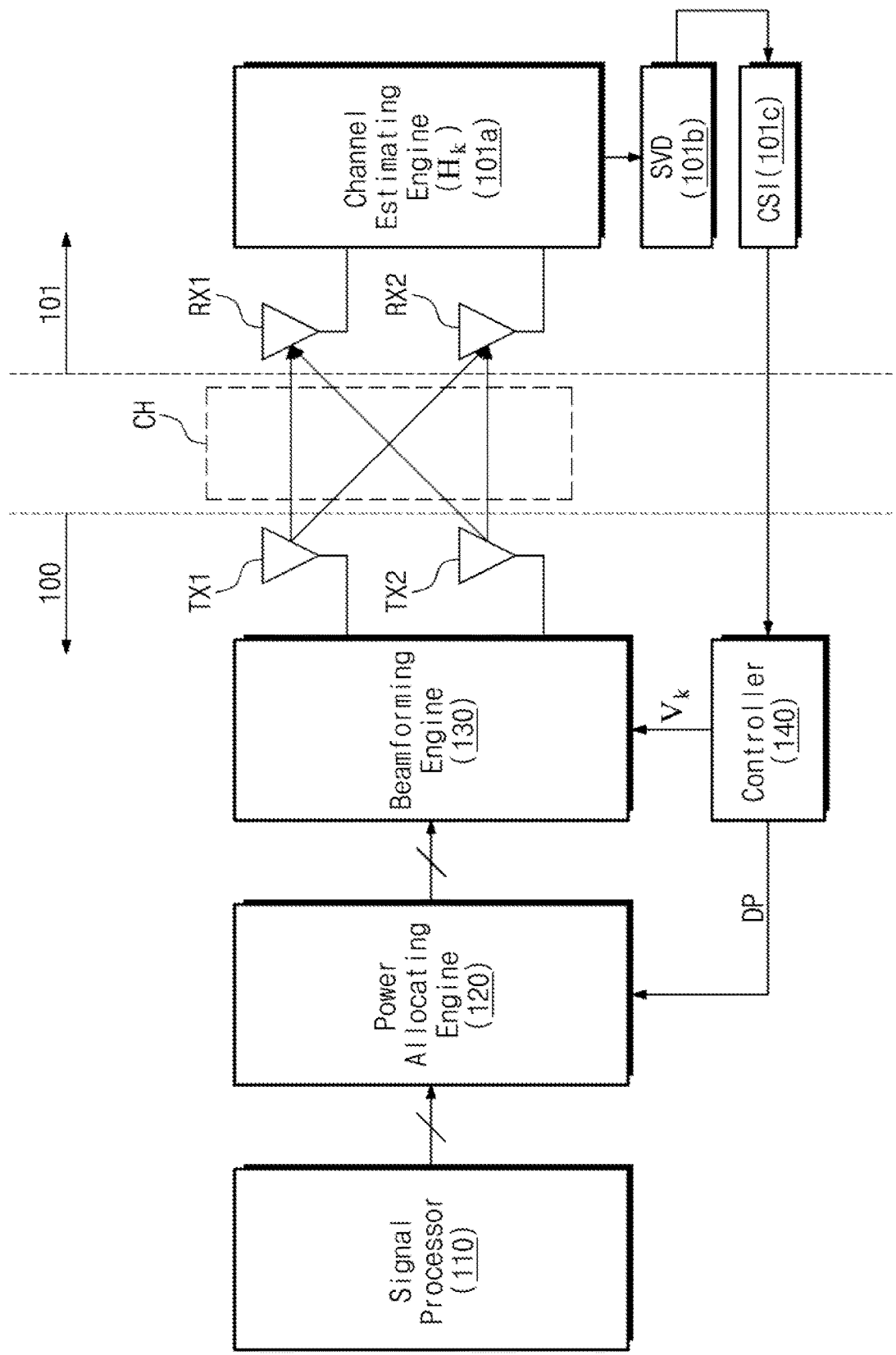
FIG. 4 is a block diagram illustrating first and second communication devices of FIG. 1.

FIG. 4 is a block diagram illustrating example circuit components within first and second communication devices of FIG. 1. For brevity of illustration and description, only components relevant to the communication methods taught herein are illustrated.

Referring to FIGS. 1 and 4, the wireless communication system 10 may include devices 100 and 101, which communicate with each other over the wireless channel ("spatial channel) CH. Device 100 may include a signal processor 110, a power allocating engine 120, a beamforming engine 130, a controller 140, and first and second transmission antennas TX1 and TX2. Device 101 may include a channel estimating engine 101a, a singular value decomposition engine 101b, a channel state information engine 101c, and first and second receiving antennas RX1 and RX2. In other examples, three or more transmitting antennas TX and/or receiving antennas RX are used; and the methods described herein may be extrapolated to a communication system employing the higher number or antennas.

The signal processor 110 may perform various signal processing on data to be transmitted to device 101 from device 100. In an exemplary embodiment, the signal processor 110 may include various function blocks, which pre-process data, such as an LDPC tone-mapper engine, and a cyclic shift delay (CSD) engine provided for each stream.

Data or signals processed by the signal processor 110 may be provided to the power allocating engine 120. The power allocating engine 120 may perform power allocation on data or signals processed based on the diagonal power matrix DP generated by the controller 140.

As described earlier, device 101 may feed the channel state information (CSI) back to device 100. The CSI may include information about the beam steering matrix $V_k$ and the average SNR for each stream. In detail, the first and second receiving antennas RX1 and RX2 of the second communication device 101 may receive one or more sounding packets output through the first and/or second transmission antennas TX1 and TX2. The channel estimating engine 101a may estimate the frequency response $H_k$ associated with the channel CH, based on the received signal. The singular value decomposition engine 101b may calculate the beam steering matrix $V_k$ by performing singular value decomposition on an estimated frequency response characteristic $H_k$. The channel state information engine 101c may feed back information I-$V_k$ about the beam steering matrix $V_k$ and the average SNR for each stream as the channel state information CSI.

The controller 140 may generate the diagonal power matrix DP and the beam steering matrix $V_k$ based on the channel state information CSI thus fed back. In detail, the diagonal power matrix DP may be expressed by Equation 6 below.

$$DP = \begin{bmatrix} p_1 & 0 & \cdots & 0 \\ 0 & p_2 & \cdots & 0 \\ \vdots & \vdots & \ddots & \vdots \\ 0 & 0 & \cdots & p_{N_{ss}} \end{bmatrix} = \quad \text{[Equation 6]}$$

$$\begin{bmatrix} \sqrt{\tau/SNR_1^\alpha} & 0 & \cdots & 0 \\ 0 & \sqrt{\tau/SNR_2^\alpha} & \cdots & 0 \\ \vdots & \vdots & \ddots & \vdots \\ 0 & 0 & \cdots & \sqrt{\tau/SNR_{N_{ss}}^\alpha} \end{bmatrix}$$

Referring to Equation 6, DP indicates a diagonal power matrix according to an embodiment of the inventive concept, $p_1$ to $p_{N_{ss}}$ indicate diagonal elements of the diagonal power matrix, $SNR_1$ to $SNR_{N_{ss}}$ respectively indicate average SNRs of first to $N_{SS}$-th streams, and $\tau$ and $\alpha$ are constant values ("constants"). The value of $\tau$ may be set in such a way that a condition of Equation 7 below is satisfied.

$$p_1^2 + p_2^2 + \ldots + p_{N_{ss}}^2 = N_{ss} \quad \text{[Equation 7]}$$

where the variables in Equation 7 were defined earlier.

Note that the exponent a in Eqn. 6 may be a constant for applying a magnitude of the average SNR for each stream to the power allocation matrix DP. In an exemplary embodiment, a case where α=1 may be considered as inverse power loading. As is apparent in Eqn. 6, for higher values of α, a difference between average SNRs for each stream may be more significantly applied to power allocation; and for lower values of α decrease, the difference between average SNRs for each stream may be less significantly applied to power allocation. In an exemplary embodiment, a value of a may be predetermined or may be a value adjusted in a communication process of the wireless communication system 10. A value of a may be in the range of 0 and 1.

As expressed by Equation 6, the diagonal power matrix DP may be in the form of a diagonal structure or a diagonal matrix. In the example of FIG. 4 with two transmission antennas and two receiving antennas, the number ($N_{SS}$) of streams used in wireless communication between the first and second communication devices 100 and 101 is two. In this case, the diagonal power matrix DP may be in the form of a 2×2 diagonal matrix and may be expressed by Equation 8 below.

$$DP = \begin{bmatrix} p_1 & 0 \\ 0 & p_2 \end{bmatrix} \quad \text{[Equation 8]}$$

$$p_1 = \sqrt{\frac{2}{1 + \left(\frac{SNR_1}{SNR_2}\right)^\alpha}},$$

$$p_2 = \sqrt{\frac{2}{1 + \left(\frac{SNR_2}{SNR_1}\right)^\alpha}}, \text{ where } p_1^2 + p_2^2 = 1$$

In Equation 8, $SNR_1$ indicates an average SNR of a first stream, and $SNR_2$ indicates an average SNR of a second stream. The remaining variables were defined earlier. Unlike the power allocation matrix $P_k$ of Equation 5 above, subscript "k" indicating a subcarrier is omitted from the diagonal power matrix DP of Equation 8. The reason is that the diagonal power matrix DP is identically applied to a plurality of subcarriers. That is, even though the first communication device 100 fails to recognize a characteristic (e.g., $H_k$) for each subcarrier of the channel CH, the diagonal power matrix DP may be generated based on information about the average SNR for each stream.

Signals processed by the power allocating engine 120 (i.e., results of a product of a signal processed by the signal processor 110 and the diagonal power matrix DP) may be provided to the beamforming engine 130. The beamforming engine 130 may perform beamforming based on the signals provided from the power allocating engine 120. For example, the beamforming engine 130 may receive the beam steering matrix $V_k$ from the controller 140 and may perform beamforming based on the received beam steering matrix $V_k$ to transmit data through the first and second transmission antennas TX1 and TX2.

In an exemplary embodiment, a signal processing process of the first communication device 100 may be similar to Equation 5 except that the diagonal power matrix DP is identically applied to all the subcarriers. That is, according to an embodiment of the inventive concept, even though the first communication device 100 fails to recognize the frequency response $H_k$ of the channel CH, the first communication device 100 may generate the diagonal power matrix DP based on the average SNR for each stream and may perform power allocation on each of the plurality of streams based in the generated diagonal power matrix DP. In this case, because a higher power is allocated to a stream having a relatively low average SNR, the total packet error performance may be improved.

Figure 5:
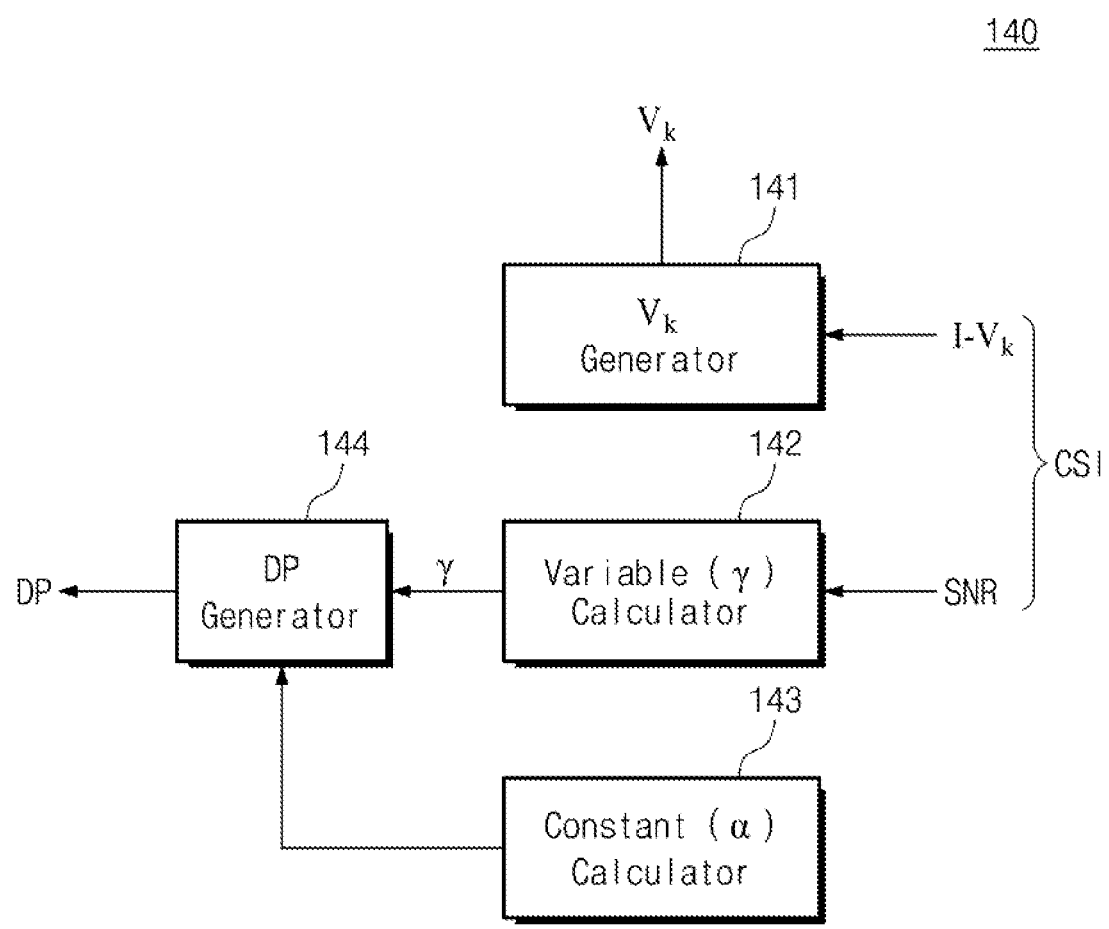
FIG. 5 is a block diagram illustrating a controller of a first communication device of FIG. 4.

FIG. 5 is a block diagram illustrating a controller of a first communication device of FIG. 4. Referring to FIGS. 4 and 5, the controller 140 may include a beam steering matrix generator 141, a variable calculator 142, a constant calculator 143, and a diagonal power matrix generator 144. The beam steering matrix generator 141 may generate a beam steering matrix $V_k$ based on information I-$V_k$ about the beam steering matrix $V_k$ of the channel state information CSI fed back from the second communication device 101. The generated beam steering matrix $V_k$ may be provided to the beamforming engine 130.

The variable calculator 142 may generate variables γ based on the average SNR for each stream included in the channel state information CSI. In an exemplary embodiment, a variable γ may indicate a ratio between average SNRs of two streams. For example, as described above, in the case where the number $N_{ss}$ of streams used in wireless communication between the first and second communication devices 100 and 101 is 2, the variables γ may be a variable γ1 equaling $SNR_1/SNR_2$ and a variable γ2 equaling $SNR_2/SNR_1$ (representing the corresponding ratios in Eqn. 8). Alternatively, each variable γ indicates a deviation of the average SNR for each stream from a reference average SNR.

The constant calculator 143 may calculate a constant α (used in Eqns. 6 and 8) necessary to generate the diagonal power matrix DP. For example, the constant α may be a constant for applying a magnitude of the average SNR for each stream to the power allocation matrix DP. In an exemplary embodiment, the constant α may be a value determined according to a coding scheme (e.g., a modulation and coding scheme (MCS)), a channel environment, etc. of the wireless communication system 10 or may be determined in the process of manufacturing the first communication device 100.

The diagonal power matrix generator 144 may generate the diagonal power matrix DP based on the variable γ and the constant α. As described above, the generated diagonal power matrix DP may be in the form of a diagonal matrix of "$N_{SS} \times N_{SS}$" and may be identically applied to each of a plurality of subcarriers. The generated diagonal power matrix DP may be provided to the power allocating engine 120.

Figure 6:
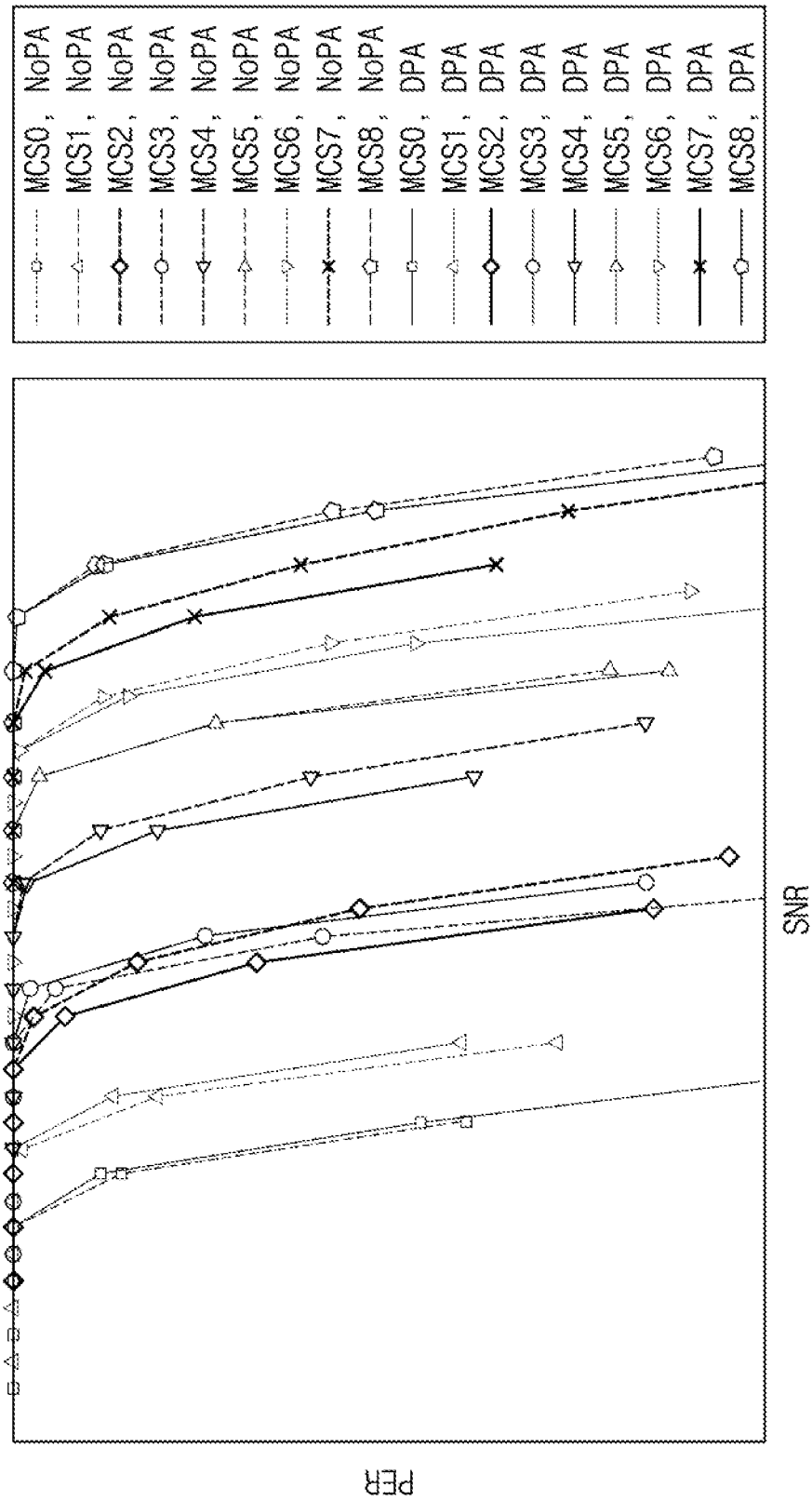
FIGS. 6 and 7 are graphs illustrating packet error performance to which a diagonal power matrix described with reference to FIG. 4 is applied.
Figure 7:
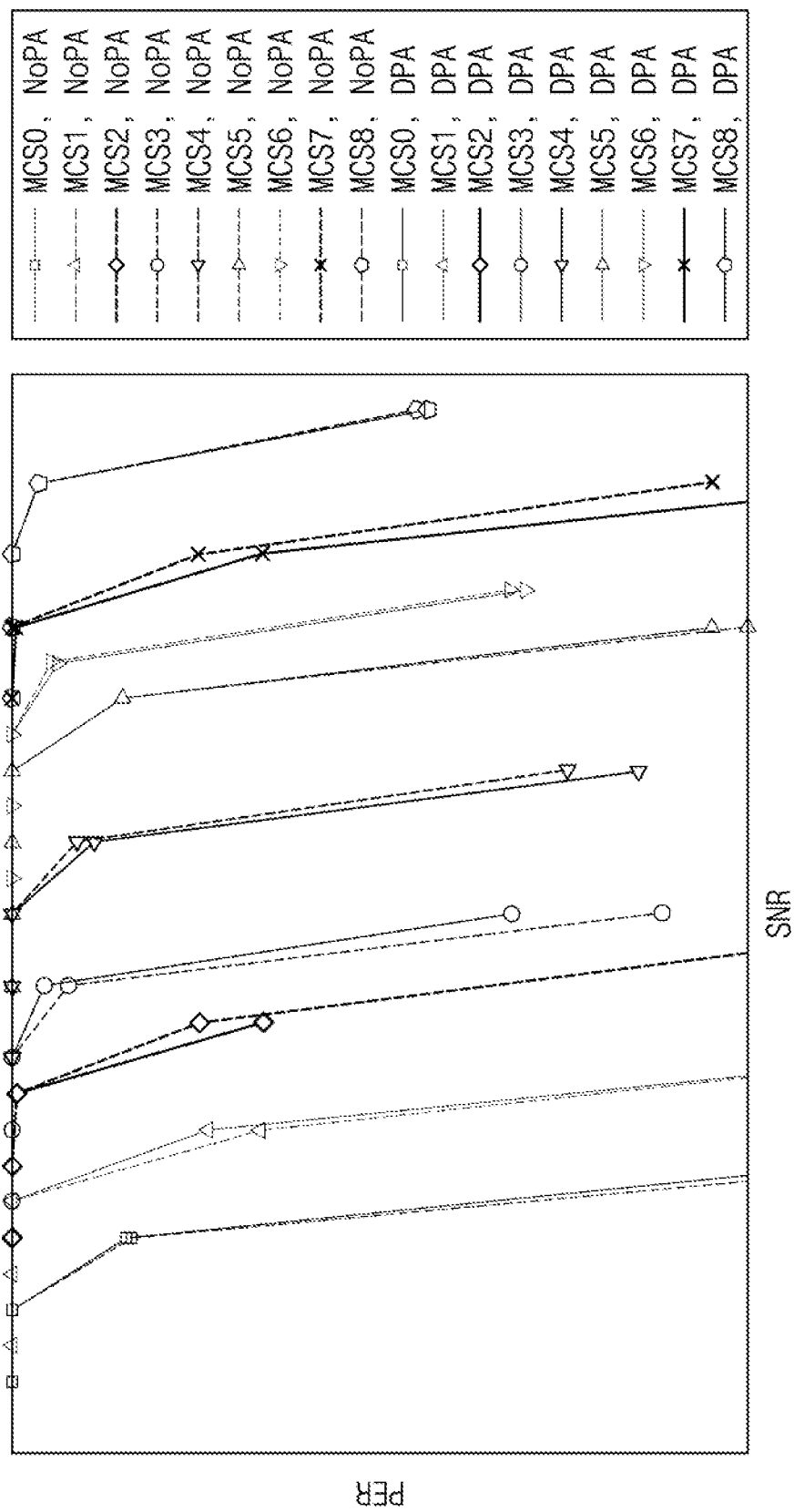

FIGS. 6 and 7 are graphs illustrating packet error performance to which a diagonal power matrix described with reference to FIG. 4 is applied. In the graphs of FIGS. 6 and 7, horizontal axes represent a signal to noise ratio, and vertical axes represent packet error performance.

The graphs of FIGS. 6 and 7 show performance indicators, which are associated with a configuration to which the diagonal power matrix-based power allocation scheme according to an embodiment of the inventive concept is applied and a configuration to the diagonal power matrix-based power allocation scheme according to an embodiment of the inventive concept is not applied and which are measured under various modulation coding conditions (e.g., modulation coding schemes (MSCs)) (e.g., MCS0 to MCS8). For brevity of illustration and convenience of description, the configuration to which the diagonal power matrix-based power allocation scheme according to an embodiment of the inventive concept is applied is marked by "DPA (Diagonal Power Allocation)", and the configuration to which the diagonal power matrix-based power allocation scheme according to an embodiment of the inventive concept is not applied is marked by "NoPA (No Power Allocation)".

The graph of FIG. 6 relates to a wireless communication system in which the number of transmission antennas is 2, the number of receiving antennas is 2, and the number of streams is 2, and the graph of FIG. 7 relates to a wireless communication system in which the number of transmission antennas is 4, the number of receiving antennas is 2, and the number of streams is 2.

Referring to FIGS. 6 and 7, the graphs corresponding to the DPA (i.e., graphs associated with the configuration to which the power allocation scheme according to the inventive concept is applied) have improved packet error performance compared to the graphs corresponding to the NoPA (i.e., graphs associated with the configuration to which the power allocation scheme according to the inventive concept is not applied). For example, referring to the performance indicator based on a sixth modulation coding scheme MCS6, at the same SNR, the packet error performance of the DPA is higher than the packet error performance of the NoPA. Likewise, each of the remaining modulation coding schemes (e.g., MCS0 to MCS5, MCS7, and MCS8) may show a similar difference between the packet error performance of the DPA and the packet error performance of the NoPA (i.e., the DPA may have packet error performance higher than the NoPA).

In an exemplary embodiment, in specific modulation coding schemes (e.g., MCS0, MCS1, and MCS3), as the power allocation scheme of the inventive concept is applied, there be a trend in which the packet error performance decreases. According to an embodiment of the inventive concept, as a power allocation matrix is implemented in the form of a rotation matrix, the packet error performance according to the specific modulation coding schemes described above may be improved. Below, a configuration of a power allocation matrix of a rotation matrix form, that is, a configuration of the rotation power matrix RP will be described.

Figure 8:
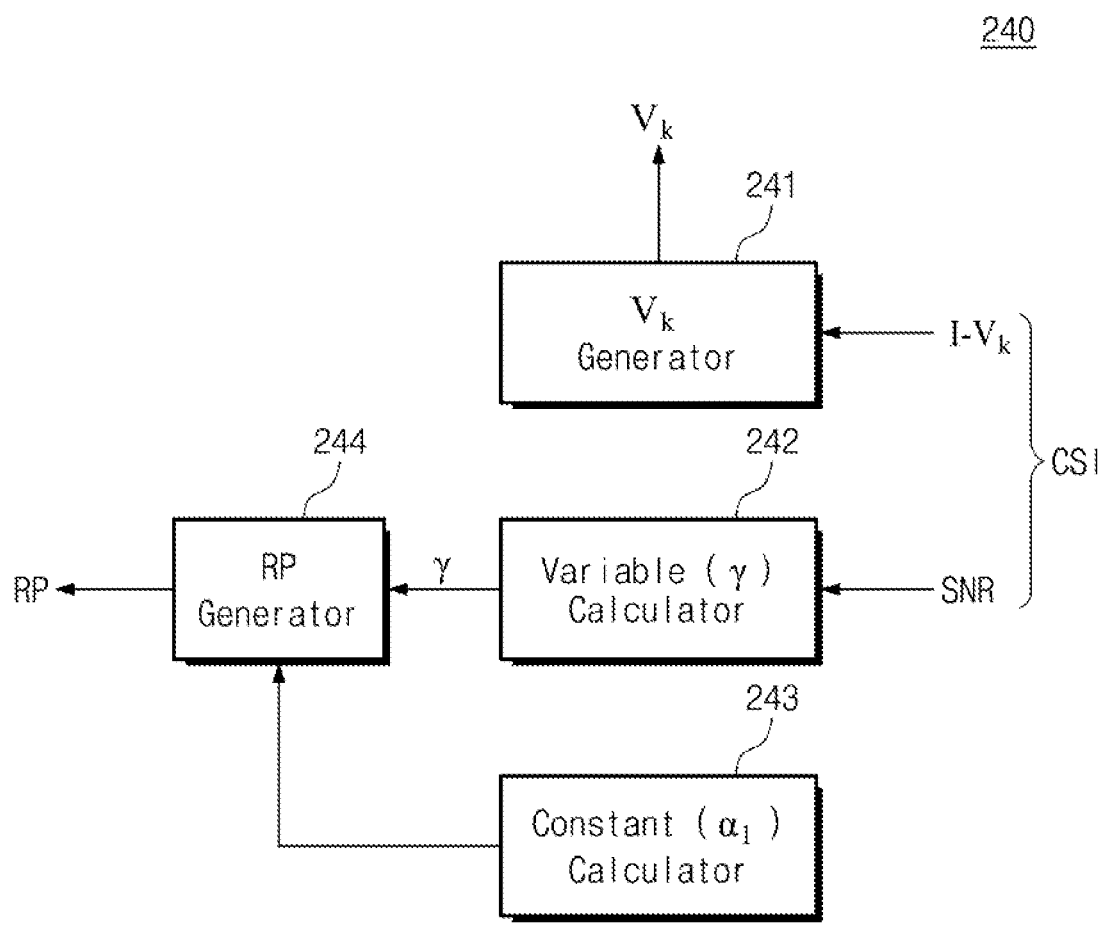
FIG. 8 is a block diagram illustrating a controller included in a first communication device according to an embodiment of the inventive concept.
Figure 9:
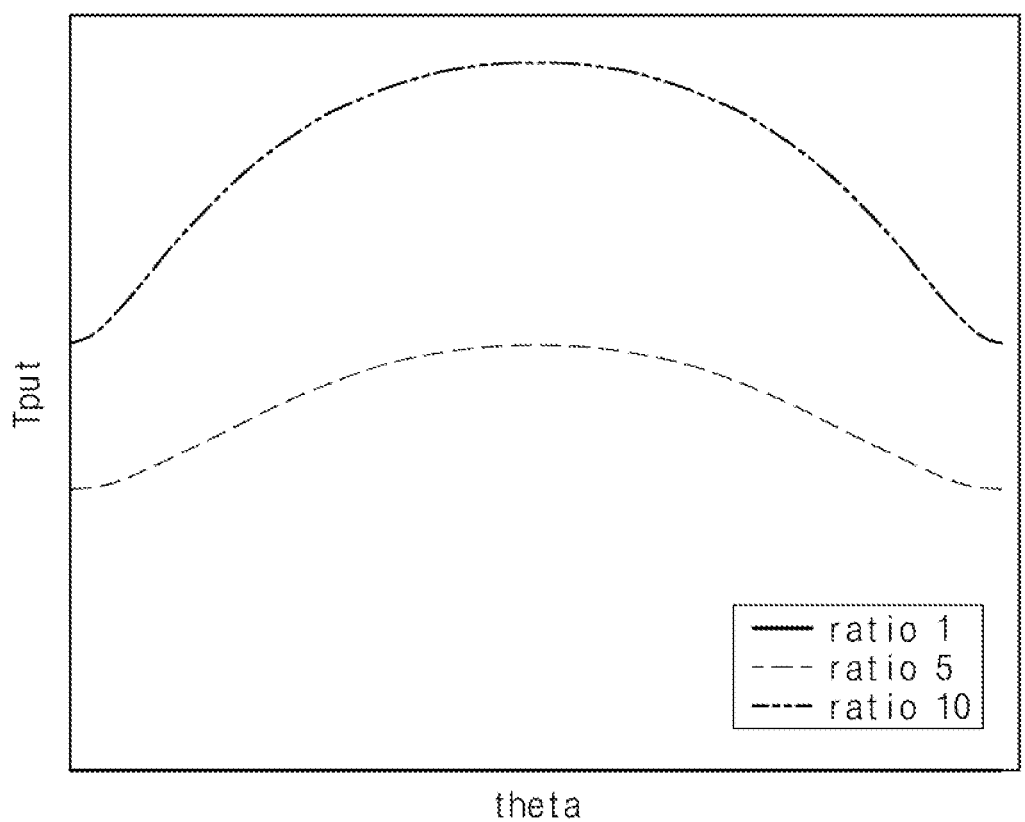
FIGS. 9 to 11 are graphs for describing a rotation power matrix generated by a rotation power matrix generator of a controller of FIG. 8.
Figure 10:
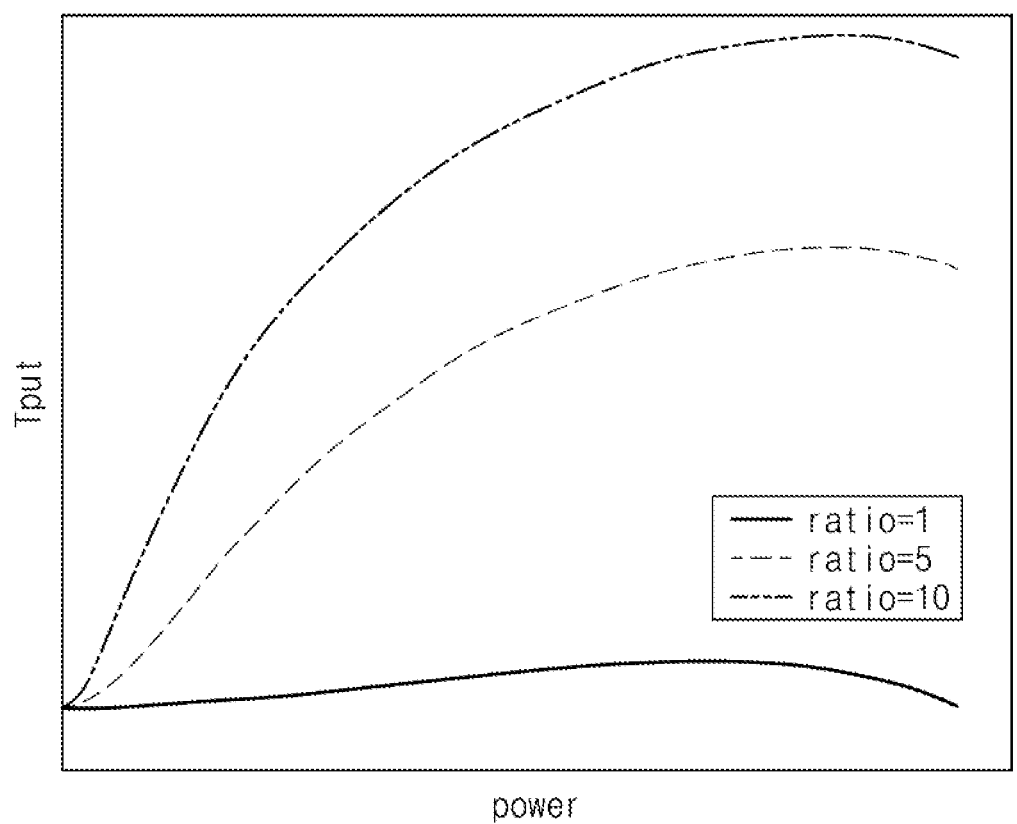
Figure 11:
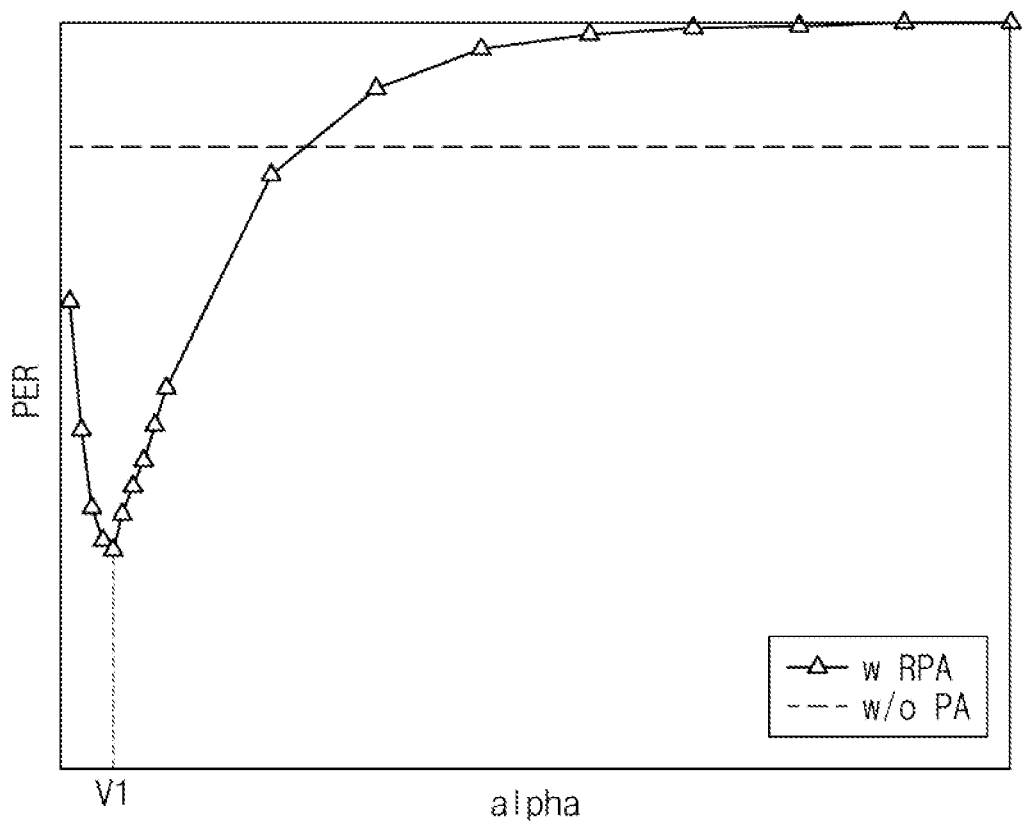

FIG. 8 is a block diagram illustrating a controller included in a first communication device according to an embodiment of the inventive concept. FIGS. 9 to 11 are graphs for describing a rotation power matrix generated by a rotation power matrix generator of a controller of FIG. 8. In an exemplary embodiment, the controller 140 of FIG. 5 may generate the diagonal power matrix DP of the diagonal structure, while a controller 240 of FIG. 8 may generate a rotation power matrix RP of a rotation structure.

Referring to FIG. 8, the controller 240 may include a beam steering matrix generator 241, a variable calculator 242, a constant calculator 243, and a power allocation matrix generator 244. The beam steering matrix generator 241 is similar to that described with reference to FIG. 5, and thus, additional description will be omitted to avoid redundancy.

The variable calculator 242 may generate the variables $\gamma$ (at least $\gamma 1$ and $\gamma 2$ as discussed earlier) based on the average SNR for each stream included in the channel state information CSI. In an exemplary embodiment, each variable $\gamma$ may indicate a ratio of the average SNR for each stream. For example, as in the above description, in the case where the number of streams used in wireless communication between the first and second communication devices 100 and 101 is 2, the variable $\gamma$ may be $SNR_1/SNR_2$ or $SNR_2/SNR_1$ (as in Eqn. or may be $(SNR_1/SNR_2)^{1/2}$ or $(SNR_2/SNR_1)^{1/2}$. Alternatively, each variable $\gamma$ indicates a deviation of the average SNR for each stream from a reference SNR.

The constant calculator 243 may calculate a constant $\alpha_2$ necessary to generate the power allocation matrix RP. The power allocation matrix generator 244 may generate the rotation power matrix RP based on the variable $\gamma$ and the constant $\alpha_2$. Below, the rotation power matrix RP will be more fully described. For convenience of description, it is assumed that the number $N_{SS}$ of streams is 2. In the case where the number $N_{ss}$ of streams is 2, the channel characteristic "H" of a specific channel is given, and a singular value matrix "V" and the power allocation matrix "P" of the specific channel are applied, the channel capacity "C" is expressed by Equation 9 below.

$$C = \log_2 |I + snr \ PVHH^H V^H P^H| \qquad \text{[Equation 9]}$$
$$= \log_2 \left| I + snr \ P \begin{bmatrix} \sigma_1^2 & 0 \\ 0 & \sigma_2^2 \end{bmatrix} P^H \right|$$

Factors of Equation 9 above are described above, and thus, additional description will be omitted to avoid redundancy. Referring to Equation 9 above, a diagonal matrix form or a rotation matrix form may be considered as the power allocation matrix "P". In the case where the power allocation matrix "P" is the diagonal matrix, that is, the diagonal power matrix DP, a result of $PVHH^H V^H P^H$ is in the form of a diagonal matrix. In the case where the power allocation matrix "P" is a rotation matrix, that is, the rotation power matrix RP, a result of $PVHH^H V^H P^H$ may include an off-diagonal term value. The above off-diagonal term value may act as an inter-stream interference at a receiving stage (e.g., the second communication device 101), and the inter-stream interference may decrease the packet error performance.

In an exemplary embodiment, in the case where the receiving stage (e.g., the second communication device 101) is a maximum likelihood (ML) receiver or includes a successive interference cancellation receiver, the inter-stream interference may be canceled at a low modulation order or a low coding rate (e.g., an MCS of a relatively low level).

Accordingly, in the case where ignoring the off-diagonal term value of Equation 9, an effective throughput may be defined. The effective throughput when the power allocation matrix "P" is the rotation matrix, that is, the rotation power matrix RP and the effective throughput when the power allocation matrix "P" is the diagonal matrix, that is, the diagonal power matrix DP may be expressed by Equation 10 and Equation 11, respectively.

$$Tput_{RPA}=\log_2(1+snr*\sigma_1^2*\cos^2\theta+\sigma_2^2*\sin^2\theta)+\log_2(1+snr*\sigma_1^2*\sin^2\theta+*\cos^2\theta) \quad \text{[Equation 10]}$$

$$Tput_{DPA}=\log_2(1+snr*\sigma_1^2 p_1^2)+\log_2(1+snr*\sigma_2^2(2-p_1^2)) \quad \text{[Equation 11]}$$

Equation 10 above shows a first effective throughput $Tput_{RP}$ when the rotation power matrix RP is applied, and Equation 11 above shows a second effective throughput $Tput_{DP}$ when the diagonal power matrix DP is applied. Factors of Equation 10 and Equation 11 are described above, and thus, additional description will be omitted to avoid redundancy.

In an exemplary embodiment, the graphs of FIGS. 9 and 10 are graphs shows the first effective throughput $Tput_{RP}$ and the second effective throughput $Tput_{DP}$ according to a ratio (ratio=$\sigma_1/\sigma_2$) of a singular value. In the graph of FIG. 9, a horizontal axis represents an angle θ of Equation 10 above, and a vertical axis represents an effective throughput $Tput_{RP}$. In the graph of FIG. 10, a horizontal axis represents an angle $p_1$ of Equation 11 above, and a vertical axis represents an effective throughput $Tput_{DP}$.

As understood from the graphs of FIGS. 9 and 10, as a ratio (ratio=$\sigma_1/\sigma_2$) of a singular value increases (i.e., a difference between singular values becomes greater), the power allocation matrix RP having a rotation matrix form has a greater effective throughput.

In an exemplary embodiment, in the case where the rotation power matrix RP is applied, as an effective throughput increases, an off-diagonal term value may increase together. For this reason, to improve the total packet error performance, an appropriate coefficient may be applied to the rotation power matrix RP.

According to the above description, the rotation power matrix RP according to the inventive concept may be expressed by Equation 12 below. In an exemplary embodiment, the rotation power matrix RP of Equation 12 below shows a schematic form of the rotation power matrix RP corresponding to the case where the number $N_{SS}$ of streams is 2.

$$RP = \begin{bmatrix} \cos\theta & -\sin\theta \\ \sin\theta & \cos\theta \end{bmatrix} \text{ or } \begin{bmatrix} c & -s \\ s & c \end{bmatrix} \text{ for } c^2+s^2=1 \quad \text{[Equation 12]}$$

Factors of Equation 12 above are described above, and thus, additional description will be omitted to avoid redundancy. A value of θ or "c" of the power allocation matrix RP of Equation 12 above may be determined or calculated based on information about an average SNR for each stream included in the channel state information CSI fed back. Alternatively, a given candidate set for a value of θ or "c" may exist, and a value of θ or "c" may be selected from the given candidate set based on information about the average SNR for each stream such that there is implemented a maximum throughput expected with respect to the average SNR for each stream.

In an exemplary embodiment, geometric mean decomposition (GMD) of Equation 13 below may be used to determine a value of θ or "c"

$$GMD(H) = QRP^H \text{ where } R = \begin{bmatrix} \sigma_1\sigma_2 & 0 \\ 0 & \sigma_1\sigma_2 \end{bmatrix}, \quad \text{[Equation 13]}$$

-continued
$$P = \begin{bmatrix} c & -s \\ s & c \end{bmatrix}$$

Referring to Equation 13 above, χ is an inter-stream interference term. The remaining factors are described above, and thus, additional description will be omitted to avoid redundancy. In Equation 13 above, values of "c" and "s" may be defined as expressed by Equation 14 below.

$$c = \frac{1}{\sqrt{\gamma+1}}, s = \frac{\sqrt{\gamma}}{\sqrt{\gamma+1}}, \gamma = \frac{\sigma_1}{\sigma_2} \quad \text{[Equation 14]}$$

where the variables in equation 14 were defined earlier. Referring to Equation 13 and Equation 14 above, as a ratio of singular values of a channel, that is, γ increases, "c" or cos θ may become smaller. That is, it may be confirmed through Equation 13 and Equation 14 above that as a ratio of singular values of a channel, that is, γ increases, rotation is more required to obtain the same effective channel gain, thus making the inter-stream interference term χ greater.

Equation 15 below shows the rotation power matrix RP according to the inventive concept, which is defined based on Equation 11 to Equation 14 above.

$$RP = \begin{bmatrix} c & -s \\ s & c \end{bmatrix} \text{ where } c = \frac{1}{\sqrt{\alpha\gamma+1}} \text{ for } \gamma = \sqrt{\frac{SNR_1}{SNR_2}} \text{ and } c^2+s^2=1 \quad \text{[Equation 15]}$$

where the variables in Equation 14 were defined earlier. Referring to Equation 15, the rotation power matrix RP according to an embodiment of the inventive concept may be determined by using a "c" value that is based on the average SNR for each stream. In an exemplary embodiment, the constant α may be a compensation coefficient for the rotation power matrix RP. For example, because the power allocation matrix RP having a rotation matrix form is identically applied to all subcarriers, unlike a GMD scheme in which it is individually applied to each subcarrier at a transmitting stage (i.e., a beamformer), the constant α may be a coefficient for compensating RP.

In an exemplary embodiment, the constant α may be determined in such a way that the optimum packet error performance is implemented. For example, a graph of FIG. 11 shows a correlation between a constant $\alpha_2$ and packet error performance with regard to a configuration where the rotation power matrix RP is applied (i.e., rotation power allocation (RPA)) and a configuration where the rotation allocation is not applied (i.e., NoPA). As illustrated in FIG. 11, in the case where the constant $\alpha_2$ is a first value V1, packet error performance may be optimal, and the first value V1 may be determined as the constant $\alpha_2$ for the rotation power matrix RP.

As described above, the first communication device 100 according to an embodiment of the inventive concept may generate the power allocation matrix DP or RP based on information about the average SNR for each stream and may identically apply the generated power allocation matrix DP or RP to all subcarriers. In this case, as a relatively high power is allocated to a stream having a relatively low average SNR, the probability that an error occurs at the stream having the relatively low average SNR may decrease, and thus, the total packet error performance may be improved.

The description is given in the above embodiments as the number $N_{SS}$ of streams is two, but the inventive concept is not limited thereto. For example, in the case where the number $N_{SS}$ of streams is three or more, a power allocation matrix may be generated based on a configuration similar to that described above. For example, even though the number $N_{SS}$ of streams is three or more, the diagonal power matrix DP of a diagonal matrix form may be generated based on Equation 6 above.

In contrast, in the case where the number $N_{SS}$ of streams is three or more, the rotation power matrix RP may be implemented by using a unitary matrix or by using a block diagonal rotation matrix. For example, in the case where the number $N_{SS}$ of streams is three or more and beamforming based on the singular value decomposition (SVD) is applied, the following condition may always be satisfied: $SNR_1 > SNR_2 > \ldots SNR_{ss}^N$. Here, the rotation power matrix RP may be generated by applying a 2×2 rotation matrix in units of two streams. Because an average packet error is dominantly determined depending on the performance of a stream having the lowest average SNR, a pair of a stream having the highest average SNR and the stream having the lowest average SNR may be formed to maximally allocate a power to the stream having the lowest average SNR, and the formed pair may be applied to a rotation matrix. For example, in the case where $N_{SS}$ is 3, the rotation power matrix RP may be expressed by Equation 16 below; in the case where $N_{SS}$ is 4, the rotation power matrix RP may be expressed by Equation 17 below.

$$RP = \begin{bmatrix} 1 & 0 & 0 \\ 0 & 0 & 1 \\ 0 & 1 & 0 \end{bmatrix}$$ [Equation 16]

$$RP = \begin{bmatrix} \cos\theta & -\sin\theta & 0 \\ \sin\theta & \cos\theta & 0 \\ 0 & 0 & 1 \end{bmatrix} = \begin{bmatrix} 1 & 0 & 0 \\ 0 & 0 & 1 \\ 0 & 1 & 0 \end{bmatrix} \begin{bmatrix} c & -s & 0 \\ s & c & 0 \\ 0 & 0 & 1 \end{bmatrix}$$

$$RP = \begin{bmatrix} 1 & 0 & 0 & 0 \\ 0 & 0 & 1 & 0 \\ 0 & 0 & 0 & 1 \\ 0 & 1 & 0 & 0 \end{bmatrix} \begin{bmatrix} \cos\theta_1 & \sin\theta_1 & 0 & 0 \\ \sin\theta_1 & \cos\theta_1 & 0 & 0 \\ 0 & 0 & \cos\theta_2 & -\sin\theta_2 \\ 0 & 0 & \sin\theta_2 & \cos\theta_2 \end{bmatrix}$$ [Equation 17]

$$= \begin{bmatrix} 1 & 0 & 0 & 0 \\ 0 & 0 & 1 & 0 \\ 0 & 0 & 0 & 1 \\ 0 & 1 & 0 & 0 \end{bmatrix} \begin{bmatrix} c_1 & -s_1 & 0 & 0 \\ s_1 & c_1 & 0 & 0 \\ 0 & 0 & c_2 & -s_2 \\ 0 & 0 & s_2 & c_2 \end{bmatrix}$$

In Equation 16 and Equation 17 above, a left matrix (i.e., a matrix where all elements are "0" and "1") is a permutation matrix and may be a matrix for forming a pair of streams. In Equation 16, a value of "c" may be determined by a difference between paired $SNR_1$ and $SNR_3$. In Equation 17 above, a value of $c_1$ may be determined by a difference between paired $SNR_1$ and $SNR_4$, and a value of $c_2$ may be determined by a difference between paired $SNR_2$ and $SNR_3$.

The rotation power matrix RP may be expressed by Equation 18 below as a more general configuration.

$$RP = PM\ RM$$ [Equation 18]

$$PM = \begin{bmatrix} p_1 & p_{N_{ss}} & p_2 & p_{N_{ss}-1} & \cdots & p_{\frac{N_{ss}}{2}} & p_{\frac{N_{ss}}{2}-1} \end{bmatrix}$$

where $p_i$ the ith column vector of $N_{SS} \times N_{SS}$ identity matrix $$RM = \begin{bmatrix} R_1 & 0 & 0 & 0 \\ 0 & R_2 & 0 & 0 \\ 0 & 0 & \ddots & 0 \\ 0 & 0 & 0 & 1 \end{bmatrix} \text{ for } N_{ss} = \text{odd}$$

$$RM = \begin{bmatrix} R_1 & 0 & 0 & 0 \\ 0 & R_2 & 0 & 0 \\ 0 & 0 & \ddots & 0 \\ 0 & 0 & 0 & R_{N_{ss}/2} \end{bmatrix} \text{ for } N_{ss} = \text{even}$$

In Equation 18, RP represents a rotation power matrix, and PM represents an identity matrix of a $N_{SS} \times N_{SS}$ size. In Equation 18, $R_1$ to $R_{N_{ss}/2}$ represent a 2×2 rotation matrix (i.e., a structure of a rotation power matrix of Equation 14). As described above, values (e.g., a "c" value) of $R_1$ to $R_{N_{ss}/2}$ may be determined based on a pair of average SNRs of two streams. That is, in the case where the number Nss of streams is odd-numbered, the number of Rs in the RM may be $(N_{SS}-1)/2$; in the case where the number Nss of streams is even-numbered, the number of Rs in the RM may be $N_{SS}/2$. A way to implement a 2×2 rotation matrix of $R_1$ to $R_{N_{ss}/2}$ is similar to that described above, and thus, additional description will be omitted to avoid redundancy.

As described above, even though the number Nss of streams is three or more, a pair of streams may be generated based on average SNRs for each stream, and "c" values may be determined based on an SNR difference of the generated pair. The rotation power matrix RP may be generated through the block diagonal rotation matrix structure based on the determined "c" values.

Figure 12:
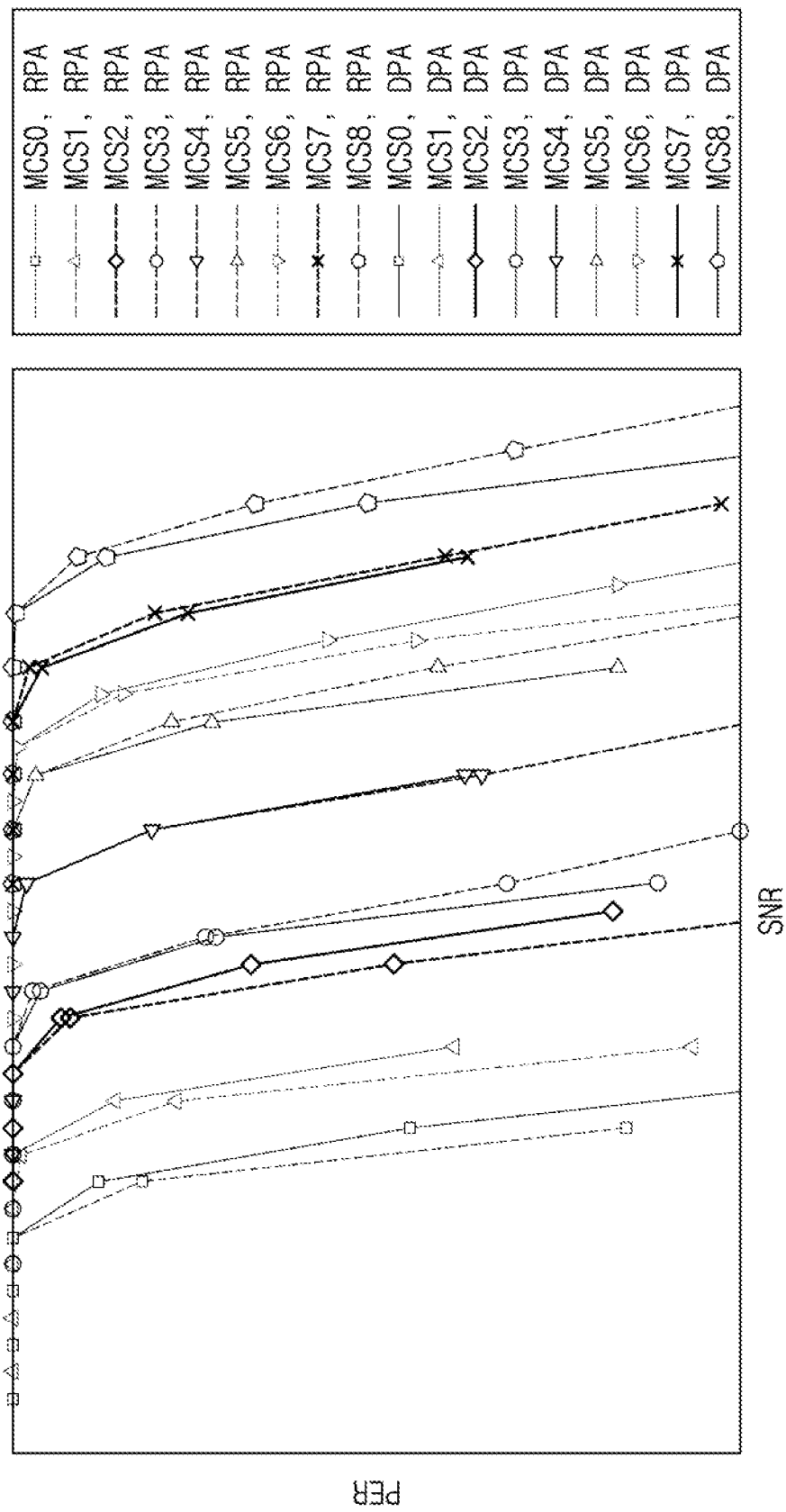
FIGS. 12 and 13 are graphs illustrating packet error performance corresponding to a configuration to which a diagonal power matrix described with reference to FIG. 5 is applied and packet error performance corresponding to a configuration to which a rotation power matrix described with reference to FIG. 8 is applied.
Figure 13:
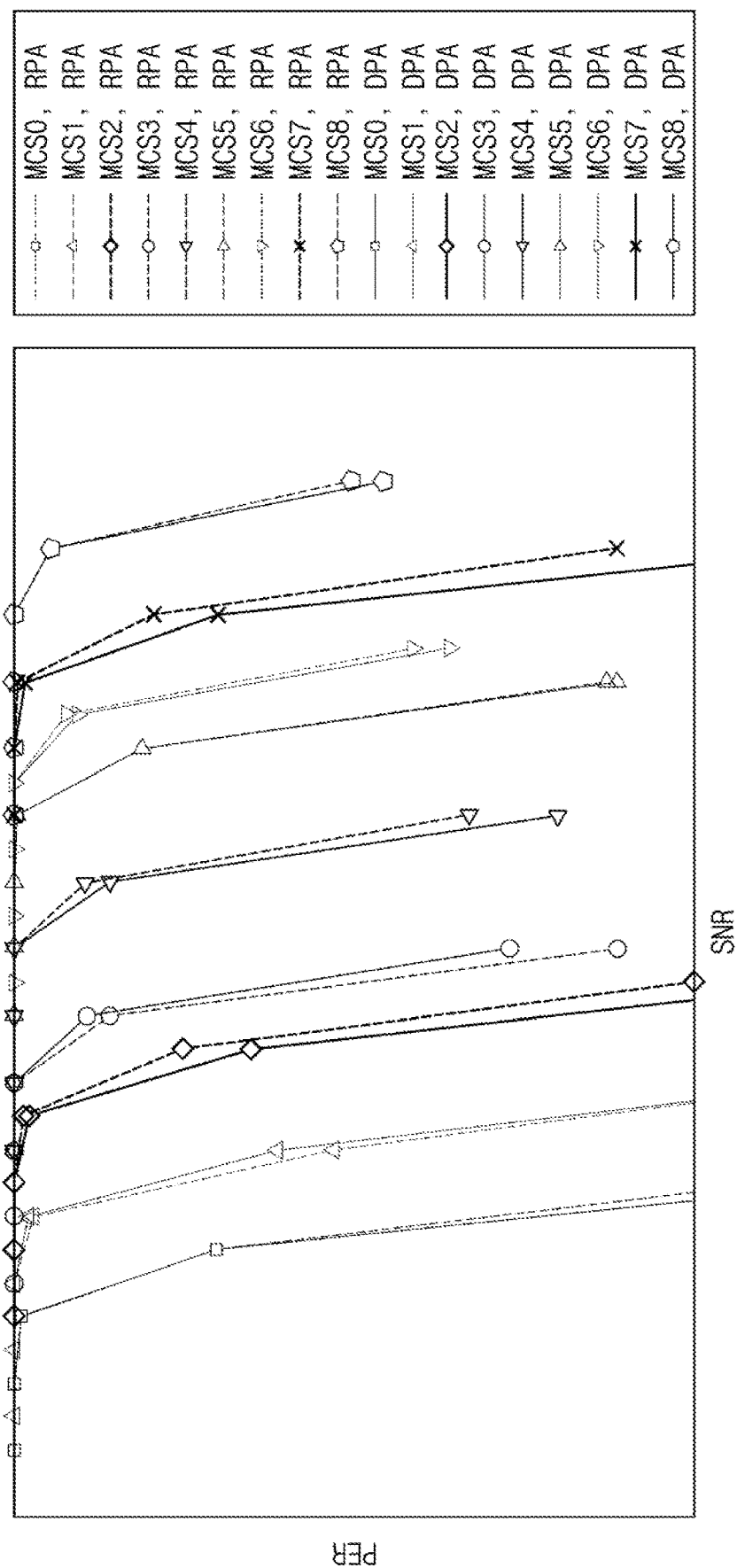

FIGS. 12 and 13 are graphs illustrating packet error performance corresponding to a configuration to which a diagonal power matrix described with reference to FIG. 5 is applied and packet error performance corresponding to a configuration to which a rotation power matrix described with reference to FIG. 8 is applied. In the graphs of FIGS. 12 and 13, horizontal axes represent a signal to noise ratio, and vertical axes represent packet error performance.

Each of the graphs of FIGS. 12 and 13 shows packet error performance corresponding to a configuration to which the diagonal power matrix DP and the rotation power matrix RP are applied depending in various modulation coding conditions (e.g., modulation coding schemes (MSCs)). The graph of FIG. 12 relates to a wireless communication system in which the number of transmission antennas is 2, the number of receiving antennas is 2, and the number of streams is 2, and the graph of FIG. 13 relates to a wireless communication system in which the number of transmission antennas is 3, the number of receiving antennas is 2, and the number of streams is 2.

Referring to FIGS. 12 and 13, graphs marked by "DPA (Diagonal Power Allocation)" indicate configurations to which the diagonal power matrix DP is applied, and graphs marked by "RPA (Rotation Power Allocation)" indicate configurations to which the rotation power matrix RP is applied.

In some modulation coding schemes, the DPA may have packet error performance better than the RPA; in other modulation coding schemes, the RPA may have packet error performance better than the DPA. For example, as illustrated in FIGS. 12 and 13, in the case of a seventh modulation coding scheme MSC7, at the same SNR, the DPA may have packet error performance better than the RPA. In contrast, in the case of a first modulation coding scheme MSC1, the RPA may have packet error performance better than the DPA.

Because the diagonal power matrix DP has a diagonal matrix form, the DPA does not cause the inter-stream interference. As such, in modulation coding schemes (e.g., MCS6, MCS7, and MCS8) of a relatively high level, the DPA has packet error performance better than the RPA. In contrast, because the rotation power matrix RP has a rotation matrix form, the PRA causes the inter-stream interference. However, because an effective SNR is relatively high in the case of the RPA, in modulation coding schemes (e.g., MCS0, MCS1, and MCS3) having a coding rate of a relatively low level, the RPA has packet error performance better than the DPA.

Figure 14:
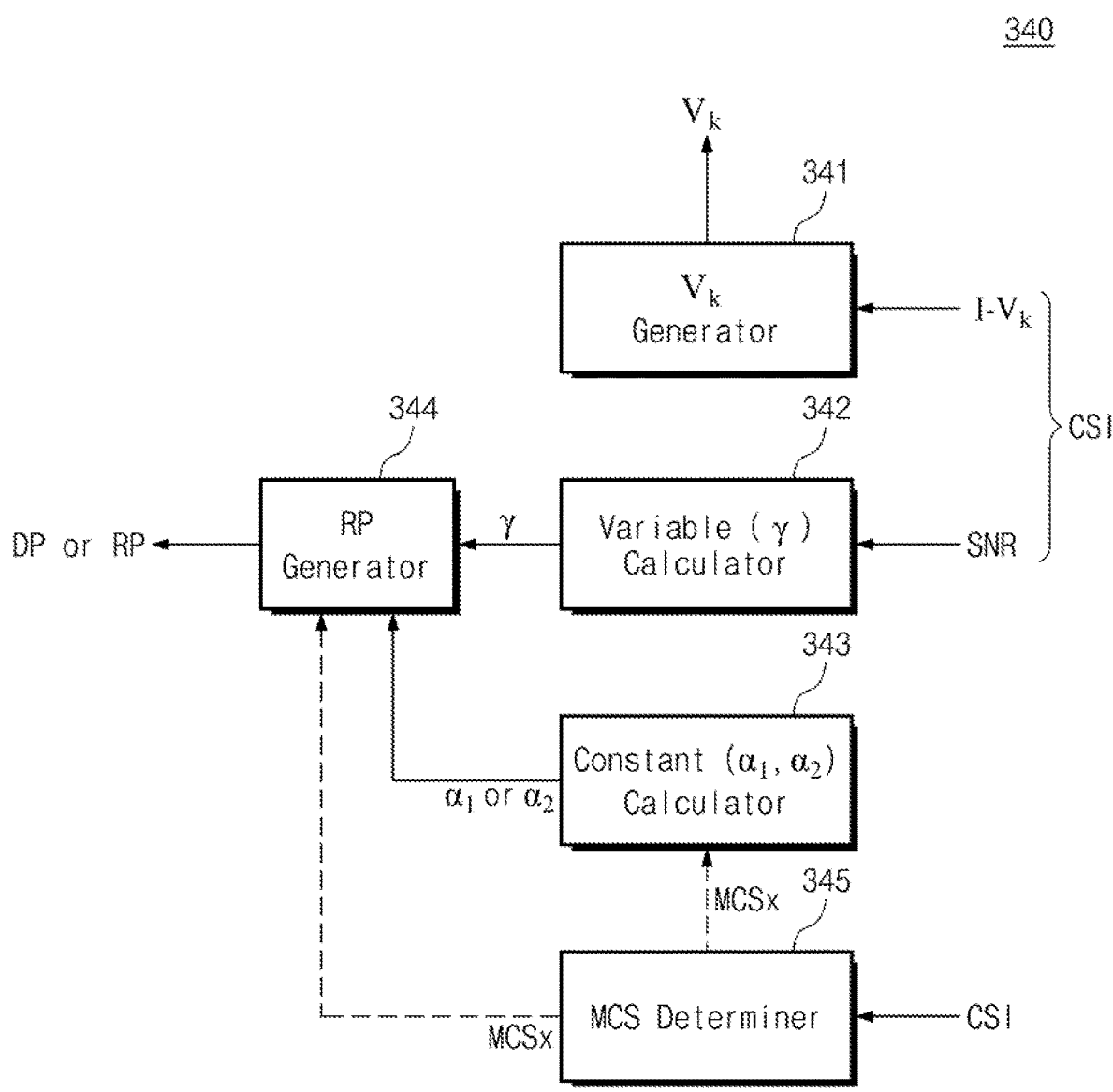
FIG. 14 is a block diagram illustrating a controller included in a first communication device according to an embodiment of the inventive concept.

FIG. 14 is a block diagram illustrating a controller included in a first communication device according to an embodiment of the inventive concept. In an exemplary embodiment, a controller 340 of FIG. 14 may be applied to the first communication device 100 described with reference to FIGS. 1 and 2 or may be included therein. Referring to FIG. 14, the controller 340 may include a beam steering matrix generator 341, a variable calculator 342, a constant calculator 343, and a power allocation matrix generator 344.

The beam steering matrix generator 341 may generate the beam steering matrix $V_k$ based on the channel state information CSI. The beam steering matrix generator 341 is described above, and thus, additional description will be omitted to avoid redundancy.

The variable calculator 342 may generate the variable γ based on the average SNR for each stream included in the channel state information CSI. In an exemplary embodiment, the variable γ may be information necessary to generate the diagonal power matrix DP or the rotation power matrix RP. The variable γ may be a deviation of the average SNR for each stream, an average SNR difference of streams, or a ratio of average SNRs of streams. A configuration of the variable γ according to a form of the power allocation matrix DP or RP is described above, and thus, additional description will be omitted to avoid redundancy.

The constant calculator 343 may calculate a constant $α_1$ or $α_2$ necessary to generate the power allocation matrix DP or RP. In an exemplary embodiment, the constant calculator 343 may output one of the constants $α_1$ or $α_z$ based on information about a modulation coding scheme MCSx determined by a modulation coding scheme determiner 345.

The modulation coding scheme determiner 345 may select the modulation coding scheme MCSx to be used for wireless communication, based on the channel state information CSI. For example, in the standard such as IEEE 802.11 of the wireless LAN (WLAN), a modulation coding scheme may be determined through various combinations of a spatial stream, a modulation form, a coding rate, etc.

The power allocation matrix generator 344 may output one of the diagonal power matrix DP and the rotation power matrix RP based on the modulation coding scheme MCSx selected by the modulation coding scheme determiner 345.

For example, as described with reference to FIGS. 6 and 7, in some modulation coding schemes, a configuration to which the diagonal power matrix DP is applied (i.e., the DPA) may cause a decrease in packet error performance. Also, as described with reference to FIGS. 12 and 13, in some modulation coding schemes, the DPA may have relatively improved packet error performance; in other modulation coding schemes, a configuration to which the rotation power matrix RP is applied (i.e., the RPA) may have relatively improved packet error performance. That is, as one of the DPA and the RPA is selectively applied depending on a modulation coding scheme, the total packet error performance of a wireless communication system may be improved.

Figure 15:
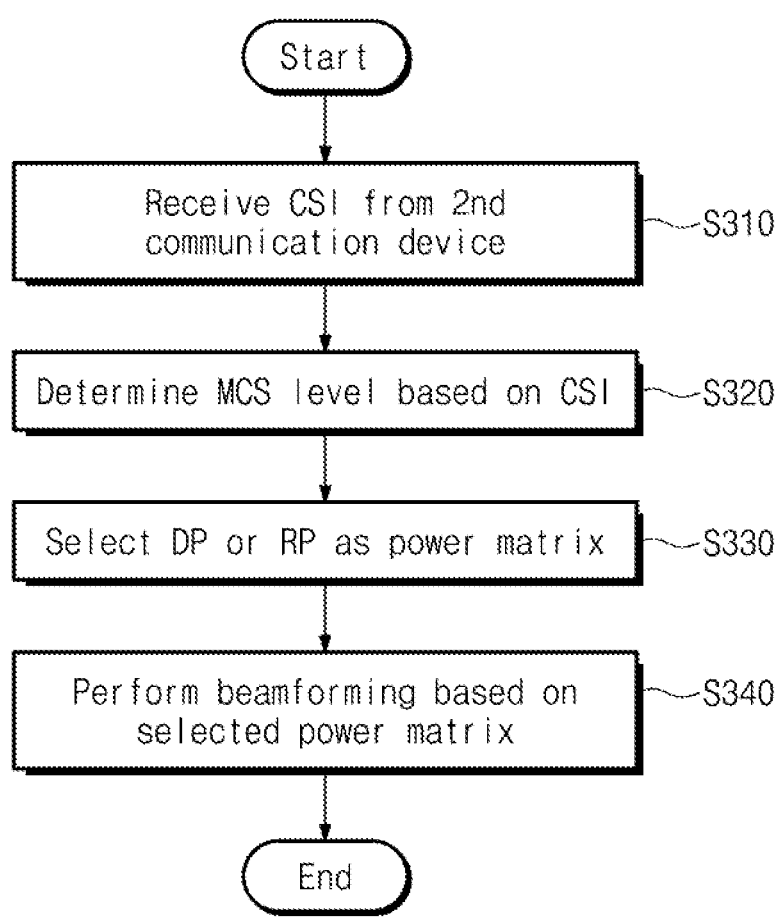
FIG. 15 is a diagram illustrating an operation of a first communication device including a controller of FIG. 14.

FIG. 15 is a diagram illustrating an operation of a first communication device including a controller of FIG. 14. For convenience of description, an operation according to a flowchart of FIG. 15 will be described with reference to the first communication device 100 of FIG. 2. In this case, device 100 may include the configuration of the controller 340 of FIG. 14. That is, device 100 may selectively use the diagonal power matrix DP or the rotation power matrix RP depending on a modulation coding scheme.

Referring to FIGS. 1, 14, and 15, in operation S310, device 100 may receive the channel state information CSI from device 101.

In operation S320, device 100 may select a level of a modulation coding scheme based on the channel state information CSI. Alternatively, device 100 may select a level of a modulation coding scheme based on a variety of information necessary in a wireless communication environment or based on a variety of other information fed back from the second communication device 101.

In operation S330, device 100 may select the power allocation matrix based on the selected level of the modulation coding scheme. For example, device 100 may select the diagonal matrix DP or the rotation matrix RP corresponding to the selected level of the modulation coding scheme.

In operation S340, the first communication device 100 may perform beamforming based on the selected power allocation matrix.

As described above, according to an embodiment of the inventive concept, the total packet error performance may be improved by selectively or adaptively applying the DPA or the RPA depending on a level of a modulation coding scheme used in a wireless communication system. In an exemplary embodiment, Table 1 below shows an exemplary configuration of modulation coding schemes and power allocation schemes applied based on the modulation coding schemes.

TABLE 1

| MCS Index | Spatial Streams | Modulation Type | Coding Rate | Adaptive PA |
|---|---|---|---|---|
| 0 | 1 | BPSK | 1/2 | RPA |
| 1 | 1 | QPSK | 1/2 | RPA |
| 2 | 1 | QPSK | 3/4 | DPA or (RPA in 2 × 2) |
| 3 | 1 | 16QAM | 1/2 | RPA (α = 0) |
| 4 | 1 | 16QAM | 3/4 | DPA |
| 5 | 1 | 64QAM | 2/3 | DPA |
| 6 | 1 | 64QAM | 3/4 | DPA |
| 7 | 1 | 64QAM | 5/6 | DPA |

Referring to Table 1, the number of spatial streams, a modulation type, and a coding rate may vary depending on a level of a modulation coding scheme (e.g., an MCS index). In an exemplary embodiment, in the case of a modulation coding scheme having a relatively fast coding rate from among modulation coding schemes of various levels, the DPA may be applied; in the case of a modulation coding scheme having a relatively slow coding rate from among the modulation coding schemes of various levels, the RPA may be applied. For example, MCS0, MCS1, and MCS3 may have a relatively small coding rate (e.g., 1/2), and MCS2, MCS4, MCS5, MCS6, and MCS7 may have a relatively great coding rate (e.g., 3/4, 2/3, 5/6. etc.). In this case, when one of MCS0, MCS1, and MCS3 having a relatively small coding rate is selected as a level of a modulation coding scheme, the first communication device 100 may perform power allocation or beamforming based on the rotation power matrix RP; when one of MCS2, MCS4, MCS5, MCS6, and MCS7 having a relatively great coding rate is selected as a level of a modulation coding scheme, the first communication device 100 may perform power allocation or beamforming based on the diagonal power matrix DP. That is, when a coding rate corresponding to the determined level of the modulation coding scheme is greater than a reference value, the diagonal power matrix DP may be selected; when the coding rate corresponding to the determined level of the modulation coding scheme is not greater than the reference value, the rotation power matrix RP may be selected.

Alternatively, even at the same level of the modulation coding scheme, the DPA or the RPA may be selectively applied depending on a communication environment, an antenna configuration, etc. For example, in the case where MCS2 is selected as a level of a modulation coding scheme, the first communication device 100 may select the diagonal power matrix DP. In this case, when transmission antennas and receiving antennas are provided to form a 2×2 matrix, the rotation power matrix RP may be selected instead of the diagonal power matrix DP. That is, the first communication device 100 may selectively apply the DPA or the RPA based on a level of a modulation coding scheme, a communication environment, an antenna configuration, etc.

In an exemplary embodiment, a configuration for selectively applying the diagonal power matrix DP or the rotation power matrix RP may be determined through various preliminary evaluations or may be actively (or adaptively) adjusted through the measurement and evaluation of an SNR or an effective throughput.

As described above, according to an embodiment of the inventive concept, a first communication device (e.g., an access point) may generate a power allocation matrix based on an average SNR for each of a plurality of streams and may perform beamforming based on the power allocation matrix thus generated. That is, even though the first communication device (e.g., an access point) fails to recognize a channel characteristic associated with each of a plurality of subcarriers, the first communication device (e.g., an access point) may perform power allocation on each of the plurality of streams based on an average SNR for each of the plurality of streams. In this case, the total packet error performance may be improved by allocating a relatively large power to a stream having a relatively low average SNR.

In an exemplary embodiment, according to an embodiment of the inventive concept, a power allocation matrix generated by the first communication device (e.g., an access point) may have a diagonal matrix structure or a rotation matrix structure. In this case, the first communication device may selectively apply the diagonal power matrix DP or the rotation power matrix RP based on the selected level of the modulation coding scheme.

Figure 16:
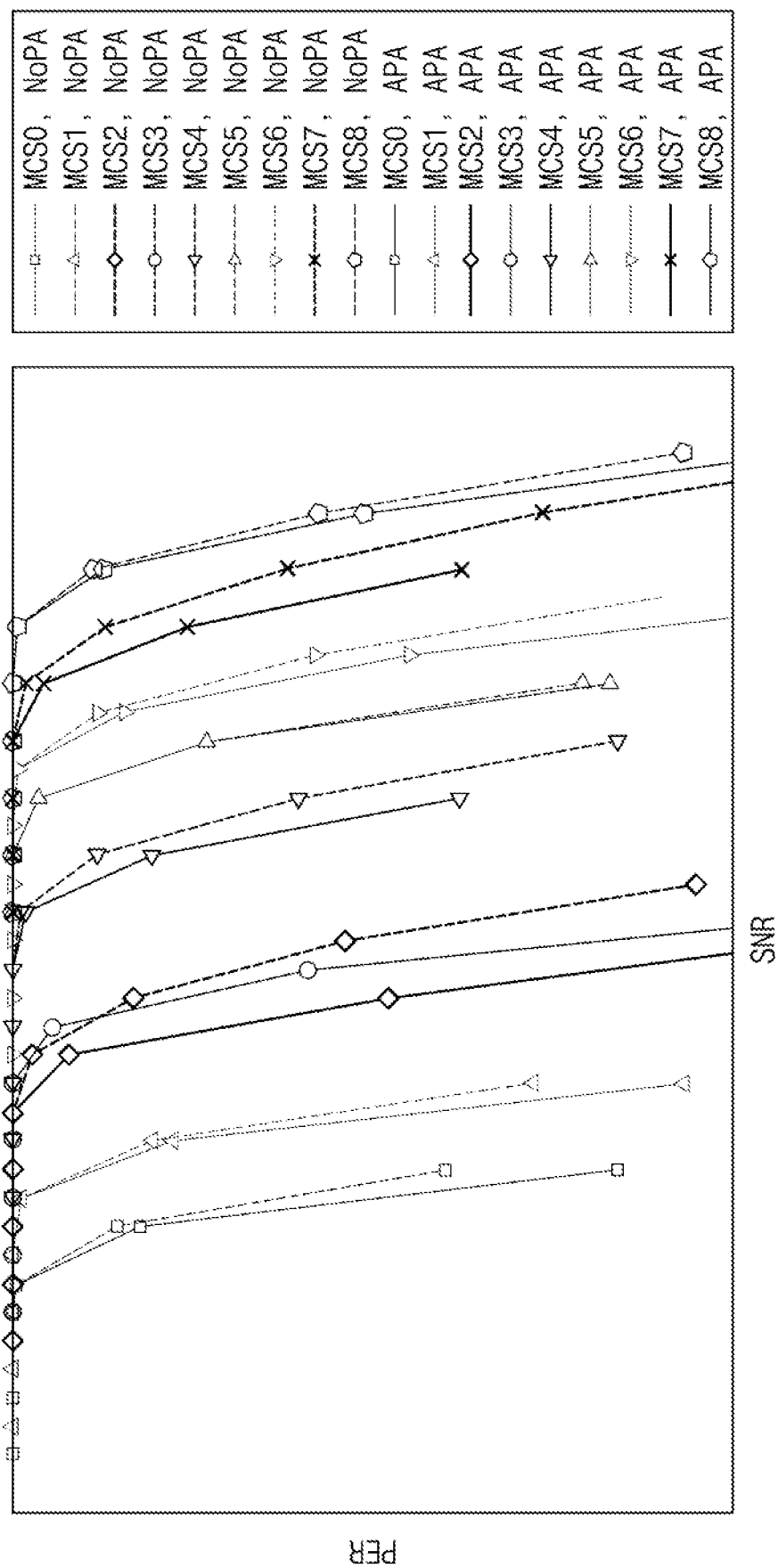
FIGS. 16 and 17 are graphs for describing an effect of adaptive power allocation of a first communication device including a controller of FIG. 14.
Figure 17:
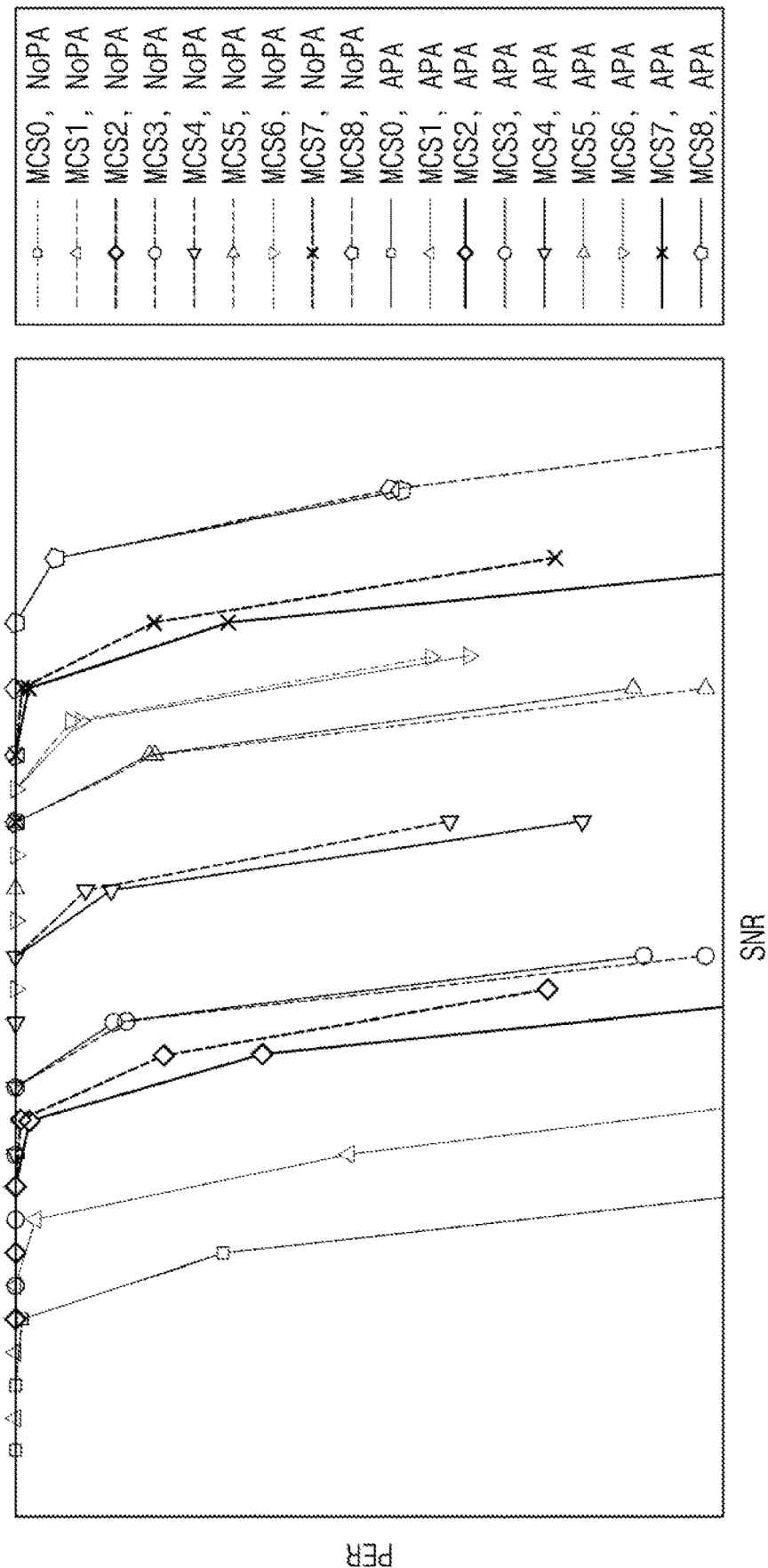

FIGS. 16 and 17 are graphs for describing an effect of adaptive power allocation of a first communication device including a controller of FIG. 14. In the graphs of FIGS. 16 and 17, horizontal axes represent a signal to noise ratio, and vertical axes represent packet error performance.

The graphs of FIGS. 16 and 17 show performance indicators according to various modulation coding conditions (e.g., a modulation coding scheme (MSC)) (e.g., MCS0 to MCS8), that is, performance indicators associated with a configuration to which a power allocation scheme (i.e., adaptive application of the diagonal power matrix DP and the rotation power matrix RP according to an MCS level) (below, for convenience of description, the adaptive application being referred to as "adaptive power allocation (APA)") described with reference to FIGS. 14 and 15 is applied and a configuration to which the adaptive power allocation is not applied. For brevity of illustration and convenience of description, the configuration to which the adaptive power allocation scheme according to an embodiment of the inventive concept is applied is denoted by "APA (Adaptive Power Allocation)", and the configuration to which the adaptive power allocation scheme according to an embodiment of the inventive concept is not applied is denoted by "NoPA (No Power Allocation)".

As illustrated in the graphs of FIGS. 16 and 17, in the configuration to which the adaptive power allocation scheme according to an embodiment of the inventive concept is applied (i.e., in the APA), packet error performance is improved at all MCS levels compared to the configuration to which the adaptive power allocation scheme is not applied (i.e., the NoPA). The reason is that power allocation is performed without occurrence of the inter-stream interference at an MCS level having a relatively high coding rate by using the diagonal power matrix DP and power allocation is performed by using the rotation power matrix RP at an MCS level having a relatively low coding rate such that an improved effective SNR is generated.

As described above, according to an embodiment of the inventive concept, the total packet error performance may be improved by selectively applying the power allocation matrix depending on an MCS level.

Figure 18:
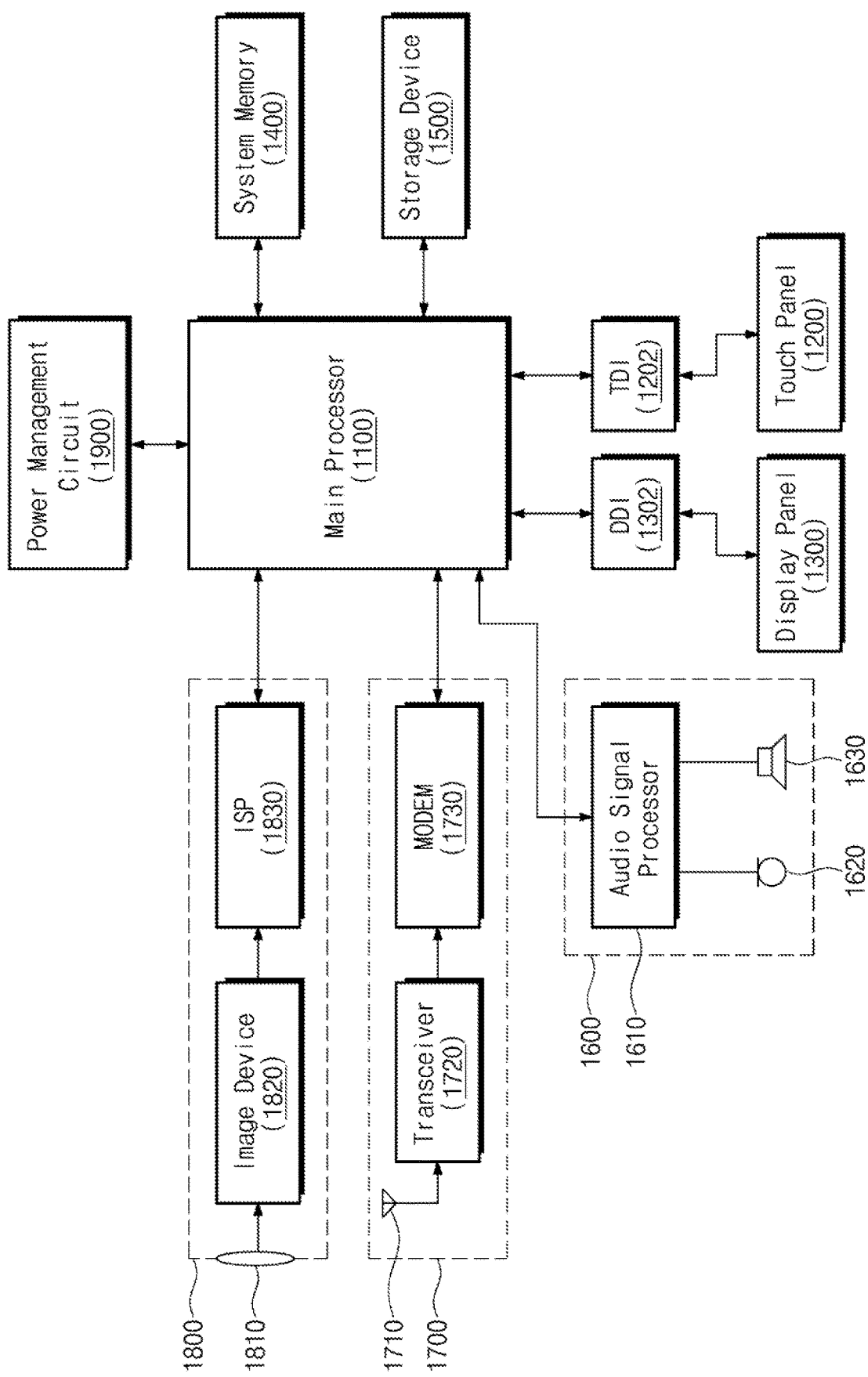
FIG. 18 is a block diagram illustrating an electronic device according to the inventive concept.

FIG. 18 is a block diagram illustrating an electronic device, 1000, according to the inventive concept. The electronic device 1000 may include a main processor 1100, a touch panel 1200, a touch driving integrated circuit 1202, a display panel 1300, a display driving integrated circuit 1302, a system memory 1400, a storage device 1500, an audio processor 1600, a communication block 1700, an image processor 1800, and a power management integrated circuit 1900. In an exemplary embodiment, the electronic device 1000 may be one of various electronic devices such as a portable communication terminal, a personal digital assistant (PDA), a portable media player (PMP), a digital camera, a smartphone, a tablet computer, a laptop computer, and a wearable device or may be one of various communication devices, which support a wireless communication relay function, such as a wireless router and a wireless communication base station. In an exemplary embodiment, the electronic device 1000 may further include any other components in addition to the components illustrated in FIG. 18 or may exclude some of the components illustrated in FIG. 18.

The main processor 1100 may control overall operations of the electronic device 1000. The main processor 1100 may control/manage operations of the components of the electronic device 1000. The main processor 1100 may process various operations for the purpose of operating the electronic device 1000.

The touch panel 1200 may be configured to sense a touch input from a user under control of the touch driving integrated circuit 1202. The display panel 1300 may be configured to display image information under control of the display driving integrated circuit 1302.

The system memory 1400 may store data that are used for an operation of the electronic device 1000. For example, the system memory 1400 may include a volatile memory such as a static random access memory (SRAM), a dynamic RAM (DRAM), or a synchronous DRAM (SDRAM), and/or a nonvolatile memory such as a phase-change RAM (PRAM), a magneto-resistive RAM (MRAM), a resistive RAM (ReRAM), or a ferroelectric RAM (FRAM).

The storage device 1500 may store data regardless of whether a power is supplied. For example, the storage device 1500 may include at least one of various nonvolatile memories such as a flash memory, a PRAM, an MRAM, a ReRAM, and a FRAM. For example, the storage device 1500 may include an embedded memory and/or a removable memory of the electronic device 1000.

The audio processor 1600 may process an audio signal by using an audio signal processor 1610. The audio processor 1600 may receive an audio input through a microphone 1620 or may provide an audio output through a speaker 1630.

The communication block 1700 may exchange signals with an external device/system through an antenna 1710. A transceiver 1720 and a modulator/demodulator (MODEM) 1730 of the communication block 1700 may process signals exchanged with the external device/system, based on at least one of various wireless communication protocols: long term evolution (LTE), worldwide interoperability for microwave access (WiMax), global system for mobile communication (GSM), code division multiple access (CDMA), Bluetooth, near field communication (NFC), wireless fidelity (Wi-Fi), and radio frequency identification (RFID). In an exemplary embodiment, the antenna 1710 of the communication block 1700 may include a plurality of antennas and may perform MIMO-based communication with an external communication device. In an exemplary embodiment, in the case where the electronic device 1000 operates as an access point (AP), the communication block 1700 may perform power allocation for each stream based on the method or the structure described with reference to FIGS. 1 to 15.

The image processor 1800 may receive a light through a lens 1810. An image device 1820 and an image signal processor 1830 included in the image processor 1800 may generate image information about an external object, based on a received light.

The power management integrated circuit 1900 may be configured to receive power from a battery or any other power source and to provide the power to the main processor 1100 or various other components.

According to embodiments of the inventive concept, a communication device may generate a power allocation matrix based on an average SNR for each stream. As such, in a communication environment where a channel characteristic for each subcarrier is not known, total packet error performance may be improved by allocating a relatively large power to a stream having a relatively low average SNR. Accordingly, a communication device with improved reliability and improved performance and an operation method thereof are provided.

While the inventive concept has been described with reference to exemplary embodiments thereof, it will be apparent to those of ordinary skill in the art that various changes and modifications may be made thereto without departing from the spirit and scope of the inventive concept as set forth in the following claims.

What is claimed is:

1. An operation method of an access point configured to provide wireless communication, the method comprising:

receiving feedback of channel response information from an external communication device;

generating a beam steering matrix based on the channel response information;

generating a power allocation matrix based on information of an average signal to noise ratio (SNR), for each of a plurality of streams, included in the channel response information; and performing beamforming with respect to the external communication device based on the generated power allocation matrix and the generated beam steering matrix, wherein the channel response information includes compressed beamforming feedback information of a multiple input multiple output single user beamforming (MIMO SUBF) based communication, and wherein a first power allocated to a first stream, of which an average SNR is a first value, from among the plurality of streams is higher than a second power allocated to a second stream, of which an average SNR is a second value greater than the first value, from among the plurality of streams.

2. The method of claim 1, wherein the power allocation matrix is identically applied to each of a plurality of subcarriers.

3. The method of claim 1, wherein the power allocation matrix is generated based on a constant value and a ratio between average SNRs of two of the plurality of streams.

4. The method of claim 1, wherein the power allocation matrix is a first power allocation matrix having a structure of a diagonal matrix or a second power allocation matrix having a structure of a rotation matrix.

5. The method of claim 4, further comprising:

determining a level of a modulation coding scheme (MCS) used in the wireless communication with the external communication device.

6. The method of claim 5, wherein one of the first power allocation matrix and the second power allocation matrix is selected as the power allocation matrix based on the determined level of the modulation coding scheme.

7. The method of claim 6, wherein, when a coding rate corresponding to the determined level of the modulation coding scheme is greater than a reference value, the first power allocation matrix is selected as the power allocation matrix; otherwise, the second power allocation matrix is selected as the power allocation matrix.

8. The method of claim 4, wherein, when a number of the plurality of streams is Nss (where Nss is a positive integer), the power allocation matrix is a diagonal matrix of an $N_{SS} \times N_{SS}$ size and is defined based on the following equation:

$$DP = \begin{bmatrix} p_1 & 0 & \cdots & 0 \\ 0 & p_2 & \cdots & 0 \\ \vdots & \vdots & \ddots & \vdots \\ 0 & 0 & \cdots & p_{N_{ss}} \end{bmatrix} = \begin{bmatrix} \sqrt{\tau/SNR_1^\alpha} & 0 & \cdots & 0 \\ 0 & \sqrt{\tau/SNR_2^\alpha} & \cdots & 0 \\ \vdots & \vdots & \ddots & \vdots \\ 0 & 0 & \cdots & \sqrt{\tau/SNR_{N_{ss}}^\alpha} \end{bmatrix}$$

where DP is the power allocation matrix, $SNR_1$ to $SNR_{Nss}$ respectively are average SNRs of the plurality of streams, and $\tau$ and $\alpha$ are constants.

9. The method of claim 8, wherein $\alpha$ is a value between 0 and 1, and wherein $\tau$ is defined to satisfy the following equation:

$$p_1^2+p_2^2+\ldots+p_{N_{ss}}^2=N_{ss}$$

where $p_1$ to $p_{N_{ss}}$ indicate diagonal elements of the diagonal matrix.

10. The method of claim 4, wherein, when a number of the plurality of streams is Nss, where Nss is a positive integer, the power allocation matrix is a block rotation matrix of an $N_{SS} \times N_{SS}$ size and is defined as:

$$RP = PM\ RM$$

$$PM = \begin{bmatrix} p_1 & p_{N_{ss}} & p_2 & p_{N_{ss}-1} & \cdots & p_{\frac{N_{ss}}{2}} & p_{\frac{N_{ss}}{2}-1} \end{bmatrix}$$

where $p_i$ is the i-th column vector of $N_{SS} \times N_{SS}$ identity matrix, $$RM = \begin{bmatrix} R_1 & 0 & 0 & 0 \\ 0 & R_2 & 0 & 0 \\ 0 & 0 & \ddots & 0 \\ 0 & 0 & 0 & 1 \end{bmatrix} \text{ for } N_{ss} = \text{odd}$$

$$RM = \begin{bmatrix} R_1 & 0 & 0 & 0 \\ 0 & R_2 & 0 & 0 \\ 0 & 0 & \ddots & 0 \\ 0 & 0 & 0 & R_{N_{ss}/2} \end{bmatrix} \text{ for } N_{ss} = \text{even}$$

where RP is the power allocation matrix, PM is a permutation matrix of an $N_{SS} \times N_{SS}$ size, and RM is the rotation matrix, which includes $R_1$ to $R_{N_{ss}/2}$.

11. The method of claim 10, wherein $R_1$ to $R_{N_{ss}/2}$ are defined based on:

$$R_s = \begin{bmatrix} c & -s \\ s & c \end{bmatrix}, \text{ where } c = \frac{1}{\sqrt{\alpha\gamma+1}}, \text{ for } \gamma = \sqrt{\frac{SNR_a}{SNR_b}} \text{ and } c^2 + s^2 = 1$$

where Rx indicates each of $R_1$ to $R_{Nss/2}$, $\alpha$ is a constant value equal to or more than 0 and equal to or less than 1, SNRa and SNRb are signal to noise ratios of a pair corresponding to each of $R_1$ to $R_{Nss/2}$ from among the plurality of streams.

12. The method of claim 1, wherein the wireless communication is wireless local area network (WLAN) communication based on IEEE 802.11.

13. The method of claim 1, wherein the beam steering matrix is generated based on singular value decomposition (SVD).

14. An operation method of an access point configured to provide wireless communication, the method comprising:
receiving feedback of channel response information from an external communication device;
generating a beam steering matrix based on the channel response information;
selecting a level of a modulation coding scheme;
selecting one of a first power allocation matrix and a second power allocation matrix based on the selected level of the modulation coding scheme; and
performing beamforming on the external communication device based on the selected one of the first and second power allocation matrices and the beam steering matrix,
wherein each of the first and second power allocation matrices is generated based on information of average signal to noise ratios (SNRs) for a respective plurality of streams, the information included in the channel response information,
wherein the first power allocation matrix has a structure of a diagonal matrix and the second power allocation matrix has a structure of a block rotation matrix,
wherein the channel response information is a compressed beamforming feedback of multiple input multiple output single user beamforming (MIMO SUBF), and
wherein a first power allocated to a first stream, of which an average SNR is a first value, from among the plurality of streams is higher than a second power allocated to a second stream, of which an average SNR is a second value greater than the first value, from among the plurality of streams.

15. The method of claim 14, wherein, when a coding rate corresponding to the selected level of the modulation coding scheme is greater than a reference value, the first power allocation matrix is selected; otherwise, the second power allocation matrix is selected.

16. The method of claim 14, wherein the level of the modulation coding scheme includes a 0-th level to a seventh level defined by an IEEE 802.11 standard,
wherein, when the selected level of the modulation coding scheme is the second, fourth, fifth, sixth, or seventh level, the first power allocation matrix is selected, and
wherein, when the selected level of the modulation coding scheme is the 0-th, first, or third level, the second power allocation matrix is selected.

17. The method of claim 16, wherein, when the selected level of the modulation coding scheme is the second level, a number of transmission antennas included in the access point is two, and a number of receiving antennas included in the external communication device is two, the second power allocation matrix is selected instead of the first power allocation matrix.

18. An access point configured to provide wireless communication, comprising:
a controller configured to receive feedback of channel state information including information about an average signal to noise ratio (SNR) for each of a plurality of streams and information about a beam steering matrix from an external communication device, and to output a power allocation matrix and the beam steering matrix based on the channel state information;
a signal processor configured to process data to be transmitted to the external communication device;
a power allocating engine configured to perform power allocation on a signal processed by the signal processor based on the power allocation matrix from the controller;
a beamforming engine configured to perform beamforming based on an output of the power allocating engine and the beam steering matrix; and
a plurality of antennas configured to transmit an output of the beamforming engine to the external communication device,
wherein the power allocating engine identically applies the power allocation matrix to each of a plurality of subcarriers to perform the power allocation, and
wherein the transmitting device performs the wireless communication with the external communication device using multiple input multiple output (MIMO) based beamforming.

19. The access point of claim 18, wherein the transmitting device is an access point, and the power allocation matrix includes a first power allocation matrix having a structure of a diagonal matrix or a second power allocation matrix having a structure of a rotation matrix.

20. The access point of claim 19, wherein the controller includes:
- a modulation coding scheme determiner configured to determine a level of a modulation coding scheme to be used in the wireless communication; and
- a power allocation matrix generator configured to generate one of the first power allocation matrix and the second power allocation matrix as the power allocation matrix based on the level of the modulation coding scheme determined by the modulation coding scheme determiner.

* * * * *